US012666427B2

(12) United States Patent
Taherzadeh Boroujeni et al.

(10) Patent No.: US 12,666,427 B2
(45) Date of Patent: Jun. 23, 2026

(54) PHYSICAL UPLINK CONTROL CHANNEL (PUCCH) RESOURCE SET WITH OR WITHOUT A PARAMETER PER PUCCH RESOURCE

(71) Applicant: QUALCOMM Incorporated, San Diego, CA (US)

(72) Inventors: Mahmoud Taherzadeh Boroujeni, San Diego, CA (US); Konstantinos Dimou, New York, NY (US); Tao Luo, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 617 days.

(21) Appl. No.: 17/933,536

(22) Filed: Sep. 20, 2022

(65) Prior Publication Data

US 2023/0098154 A1 Mar. 30, 2023

Related U.S. Application Data

(60) Provisional application No. 63/261,925, filed on Sep. 30, 2021, provisional application No. 63/261,928, filed on Sep. 30, 2021.

(51) Int. Cl.
*H04W 72/21* (2023.01)
*H04L 5/00* (2006.01)
(Continued)

(52) U.S. Cl.
CPC ........... *H04W 72/21* (2023.01); *H04L 5/0094* (2013.01); *H04W 72/0446* (2013.01); *H04W 72/23* (2023.01)

(58) Field of Classification Search
CPC ... H04L 5/0046; H04L 5/0055; H04L 5/0053; H04L 5/0094; H04L 5/0078; H04W 72/21; H04W 72/23; H04W 72/0446
(Continued)

(56) References Cited

U.S. PATENT DOCUMENTS

2017/0156138 A1* 6/2017 Yamamoto ............ H04L 5/0078
2020/0288487 A1* 9/2020 Liu ........................ H04B 1/713
(Continued)

OTHER PUBLICATIONS

International Search Report and Written Opinion—PCT/US2022/076811—ISA/EPO—Nov. 25, 2022.
(Continued)

*Primary Examiner* — Jungwon Chang
(74) *Attorney, Agent, or Firm* — Harrity & Harrity, LLP

(57) ABSTRACT

Various aspects of the present disclosure generally relate to wireless communication. In some aspects, a user equipment (UE) may receive a physical uplink control channel (PUCCH) resource set configuration including a first subset of PUCCH resources and a second subset of PUCCH resources, wherein PUCCH resources in the first subset of PUCCH resources are configured with a parameter per PUCCH resource, and wherein PUCCH resources in the second subset of PUCCH resources do not include a parameter per PUCCH resource. The UE may identify a parameter to be used for transmitting a PUCCH communication based at least in part on the PUCCH resource set configuration. The UE may transmit one or more repetitions of the PUCCH communication based at least in part on the parameter. Numerous other aspects are described.

30 Claims, 12 Drawing Sheets

300

310
Identify repetition factor for PUCCH communication based at least in part on PUCCH resource set configuration

305
PUCCH resource set configuration (including PUCCH resource subset with repetition factor, PUCCH resource subset that does not include repetition factor)

315
Identify repetition factor for PUCCH communication based at least in part on PUCCH resource set configuration

UE 120

Base station 110

320
1+ repetitions of PUCCH communication (based at least in part on repetition factor)

(51) Int. Cl.
    *H04W 72/0446*      (2023.01)
    *H04W 72/23*        (2023.01)

(58) Field of Classification Search
    USPC ......................................................... 370/329
    See application file for complete search history.

(56) References Cited

U.S. PATENT DOCUMENTS

| | | | | |
|---|---|---|---|---|
| 2021/0029731 | A1* | 1/2021 | Kundu | H04W 74/004 |
| 2022/0086772 | A1* | 3/2022 | Cozzo | H04W 52/367 |
| 2023/0137292 | A1* | 5/2023 | Zhang | H04L 5/0035 |
| | | | | 370/329 |
| 2023/0171778 | A1* | 6/2023 | Kittichokechai | H04L 1/1671 |
| | | | | 370/329 |
| 2023/0189241 | A1* | 6/2023 | Go | H04L 1/1896 |
| 2023/0276446 | A1* | 8/2023 | Matsumura | H04B 7/0695 |
| | | | | 370/329 |
| 2023/0388061 | A1* | 11/2023 | Shen | H04L 5/0055 |
| 2023/0396385 | A1* | 12/2023 | Kwak | H04L 5/0094 |
| 2023/0397204 | A1* | 12/2023 | Yuan | H04B 7/0695 |
| 2024/0267922 | A1* | 8/2024 | Ling | H04B 7/0617 |
| 2024/0306153 | A1* | 9/2024 | Kurita | H04L 1/08 |
| 2024/0323963 | A1* | 9/2024 | Fakoorian | H04L 1/1887 |

OTHER PUBLICATIONS

Nokia et al., "HARQ-ACK Feedback Enhancements for IIoT", 3GPP TSG RAN WG1 #104-e-bis, R1-2102819 3rd Generation Partnership Project, Mobile Competence Centre, 650, Route Des Lucioles, F-06921 Sophia-Antipolis Cedex, France, vol. RAN WG1, No. e-bis, Apr. 12, 2021-Apr. 20, 2021, Apr. 6, 2021, XP051993218, 20 Pages, Section 4.

Qualcomm Incorporated: "PUCCH Enhancements", 3GPP TSG-RAN WG1 Meeting #106-e, R1-2107362, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 6, 2021, XP052038307, 8 Pages, Section 2.

VIVO: "Discussion on Solutions for PUCCH Coverage Enhancement", 3GPP TSG-RAN WG1 #1 03-e, R1-2008942, 3rd Generation Partnership Project, Mobile Competence Centre, 650, Route Des Lucioles , F-06921 Sophia-Antipolis Cedex, France, vol. RAN WG1, No. e-Meeting, Oct. 26, 2020-Nov. 13, 2020, Oct. 23, 2020, XP051945432, 11 Pages, Section 3.4.

\* cited by examiner

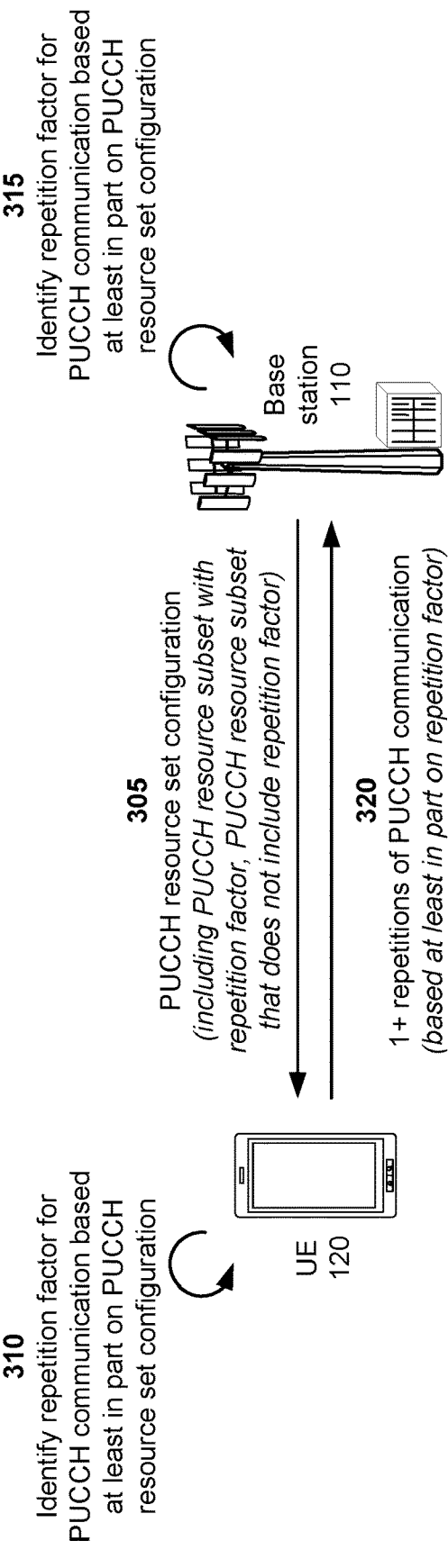

315
Identify repetition factor for PUCCH communication based at least in part on PUCCH resource set configuration Base station 110

305
PUCCH resource set configuration (including PUCCH resource subset with repetition factor, PUCCH resource subset that does not include repetition factor)

320
1+ repetitions of PUCCH communication (based at least in part on repetition factor)

UE 120

310
Identify repetition factor for PUCCH communication based at least in part on PUCCH resource set configuration

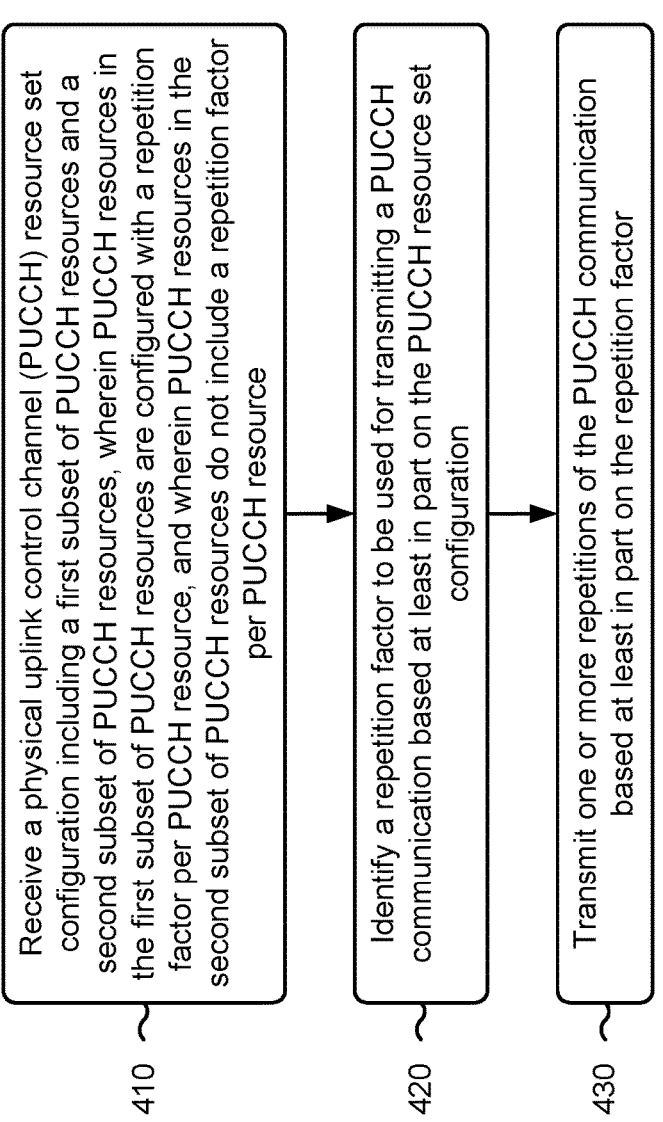

Receive a physical uplink control channel (PUCCH) resource set configuration including a first subset of PUCCH resources and a second subset of PUCCH resources, wherein PUCCH resources in the first subset of PUCCH resources are configured with a repetition factor per PUCCH resource, and wherein PUCCH resources in the second subset of PUCCH resources do not include a repetition factor per PUCCH resource

410

Identify a repetition factor to be used for transmitting a PUCCH communication based at least in part on the PUCCH resource set configuration

420

Transmit one or more repetitions of the PUCCH communication based at least in part on the repetition factor

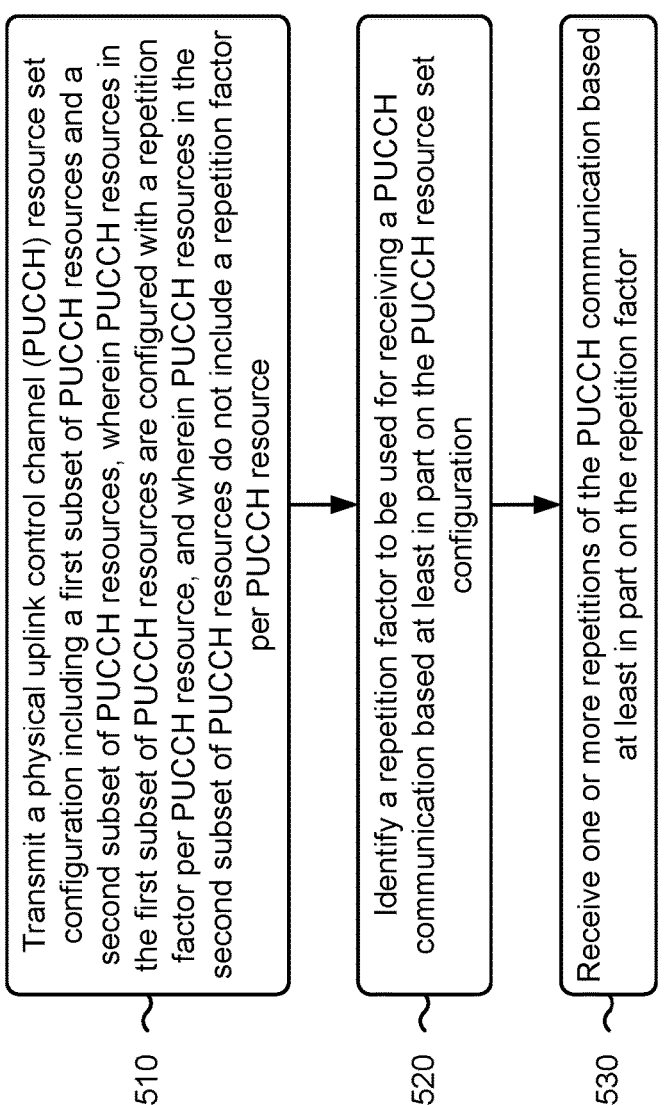

510 Transmit a physical uplink control channel (PUCCH) resource set configuration including a first subset of PUCCH resources and a second subset of PUCCH resources, wherein PUCCH resources in the first subset of PUCCH resources are configured with a repetition factor per PUCCH resource, and wherein PUCCH resources in the second subset of PUCCH resources do not include a repetition factor per PUCCH resource 520 Identify a repetition factor to be used for receiving a PUCCH communication based at least in part on the PUCCH resource set configuration 530 Receive one or more repetitions of the PUCCH communication based at least in part on the repetition factor

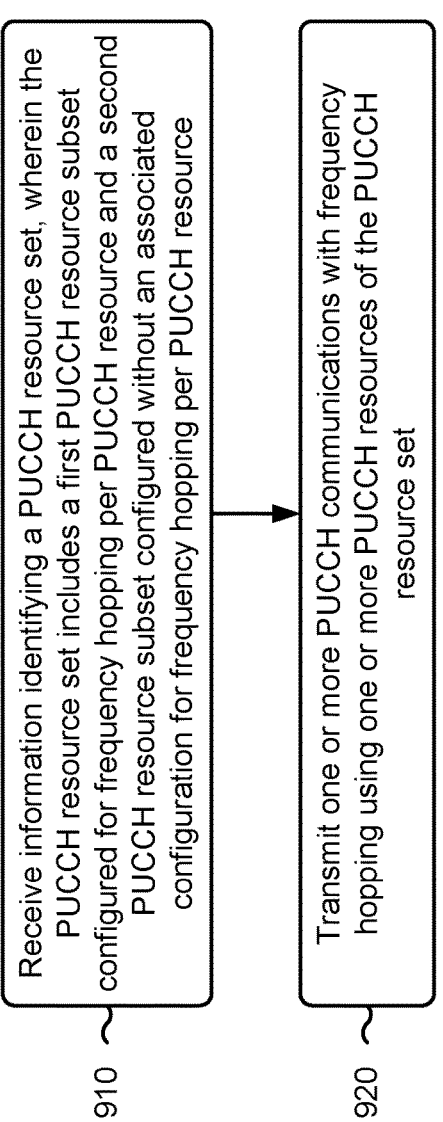

900

910 Receive information identifying a PUCCH resource set, wherein the PUCCH resource set includes a first PUCCH resource subset configured for frequency hopping per PUCCH resource and a second PUCCH resource subset configured without an associated configuration for frequency hopping per PUCCH resource 920 Transmit one or more PUCCH communications with frequency hopping using one or more PUCCH resources of the PUCCH resource set

FIG. 9

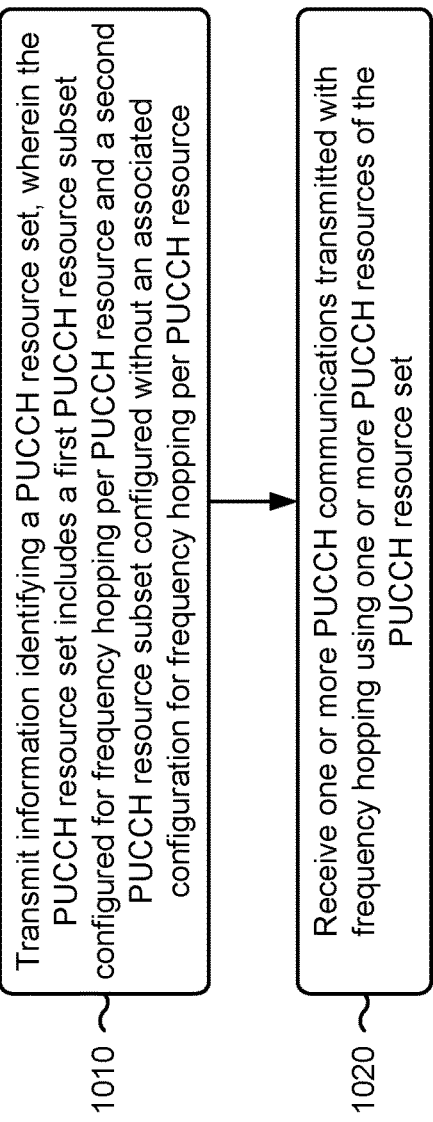

1010 — Transmit information identifying a PUCCH resource set, wherein the PUCCH resource set includes a first PUCCH resource subset configured for frequency hopping per PUCCH resource and a second PUCCH resource subset configured without an associated configuration for frequency hopping per PUCCH resource

1020 — Receive one or more PUCCH communications transmitted with frequency hopping using one or more PUCCH resources of the PUCCH resource set

PHYSICAL UPLINK CONTROL CHANNEL (PUCCH) RESOURCE SET WITH OR WITHOUT A PARAMETER PER PUCCH RESOURCE

CROSS-REFERENCE TO RELATED APPLICATIONS

This patent application claims priority to U.S. Provisional Patent Application No. 63/261,928, filed on Sep. 30, 2021, entitled "PHYSICAL UPLINK CONTROL CHANNEL (PUCCH) RESOURCE SET WITH OR WITHOUT A REPETITION FACTOR PER PUCCH RESOURCE," and assigned to the assignee hereof, and to U.S. Provisional Patent Application No. 63/261,925 filed on Sep. 30, 2021, entitled "MIXED PHYSICAL UPLINK CONTROL CHANNEL RESOURCE SET," and assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for a physical uplink control channel (PUCCH) resource set with or without a parameter per PUCCH resource.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a physical uplink control channel (PUCCH) resource set configuration including a first subset of PUCCH resources and a second subset of PUCCH resources, where PUCCH resources in the first subset of PUCCH resources are configured with a parameter per PUCCH resource, and where PUCCH resources in the second subset of PUCCH resources do not include a parameter per PUCCH resource. The method may include identifying a parameter to be used for transmitting a PUCCH communication based at least in part on the PUCCH resource set configuration. The method may include transmitting one or more repetitions of the PUCCH communication based at least in part on the parameter.

Some aspects described herein relate to a method of wireless communication performed by a base station. The method may include transmitting a PUCCH resource set configuration including a first subset of PUCCH resources and a second subset of PUCCH resources, where PUCCH resources in the first subset of PUCCH resources are configured with a parameter per PUCCH resource, and where PUCCH resources in the second subset of PUCCH resources do not include a parameter per PUCCH resource. The method may include identifying a parameter to be used for receiving a PUCCH communication based at least in part on the PUCCH resource set configuration. The method may include receiving one or more repetitions of the PUCCH communication based at least in part on the parameter.

Some aspects described herein relate to a UE for wireless communication. The UE may include a memory and one or more processors coupled to the memory. The one or more processors may be configured to receive a PUCCH resource set configuration including a first subset of PUCCH resources and a second subset of PUCCH resources. The one or more processors may be configured to identify a parameter to be used for transmitting a PUCCH communication based at least in part on the PUCCH resource set configuration. The one or more processors may be configured to transmit one or more repetitions of the PUCCH communication based at least in part on the parameter.

Some aspects described herein relate to a base station for wireless communication. The base station may include a memory and one or more processors coupled to the memory. The one or more processors may be configured to transmit a PUCCH resource set configuration including a first subset of PUCCH resources and a second subset of PUCCH resources. The one or more processors may be configured to identify a parameter to be used for receiving a PUCCH communication based at least in part on the PUCCH resource set configuration. The one or more processors may be configured to receive one or more repetitions of the PUCCH communication based at least in part on the parameter.

Some aspects described herein relate to a non-transitory computer-readable medium that stores a set of instructions for wireless communication by a UE. The set of instructions, when executed by one or more processors of the UE, may cause the UE to receive a PUCCH resource set configuration including a first subset of PUCCH resources and a second subset of PUCCH resources. The set of instructions, when executed by one or more processors of the UE, may cause the UE to identify a parameter to be used for transmitting a PUCCH communication based at least in part on the PUCCH resource set configuration. The set of instructions, when executed by one or more processors of the UE, may cause the UE to transmit one or more repetitions of the PUCCH communication based at least in part on the parameter.

Some aspects described herein relate to a non-transitory computer-readable medium that stores a set of instructions for wireless communication by a base station. The set of instructions, when executed by one or more processors of the base station, may cause the base station to transmit a PUCCH resource set configuration including a first subset of PUCCH resources and a second subset of PUCCH resources. The set of instructions, when executed by one or more processors of the base station, may cause the base station to identify a parameter to be used for receiving a PUCCH communication based at least in part on the PUCCH resource set configuration. The set of instructions, when executed by one or more processors of the base station, may cause the base station to receive one or more repetitions of the PUCCH communication based at least in part on the parameter.

Some aspects described herein relate to an apparatus for wireless communication. The apparatus may include means for receiving a PUCCH resource set configuration including a first subset of PUCCH resources and a second subset of PUCCH resources, where PUCCH resources in the first subset of PUCCH resources are configured with a parameter per PUCCH resource, and where PUCCH resources in the second subset of PUCCH resources do not include a parameter per PUCCH resource. The apparatus may include means for identifying a parameter to be used for transmitting a PUCCH communication based at least in part on the PUCCH resource set configuration. The apparatus may include means for transmitting one or more repetitions of the PUCCH communication based at least in part on the parameter.

Some aspects described herein relate to an apparatus for wireless communication. The apparatus may include means for transmitting a PUCCH resource set configuration including a first subset of PUCCH resources and a second subset of PUCCH resources, where PUCCH resources in the first subset of PUCCH resources are configured with a parameter per PUCCH resource, and where PUCCH resources in the second subset of PUCCH resources do not include a parameter per PUCCH resource. The apparatus may include means for identifying a parameter to be used for receiving a PUCCH communication based at least in part on the PUCCH resource set configuration. The apparatus may include means for receiving one or more repetitions of the PUCCH communication based at least in part on the parameter.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example associated with a physical uplink control channel (PUCCH) resource set with or without a repetition factor per PUCCH resource, in accordance with the present disclosure.

FIGS. 4 and 5 are diagrams illustrating example processes associated with a PUCCH resource set with or without a repetition factor per PUCCH resource, in accordance with the present disclosure.

FIGS. 9 and 10 are diagrams illustrating example processes associated with mixed PUCCH resource set usage, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
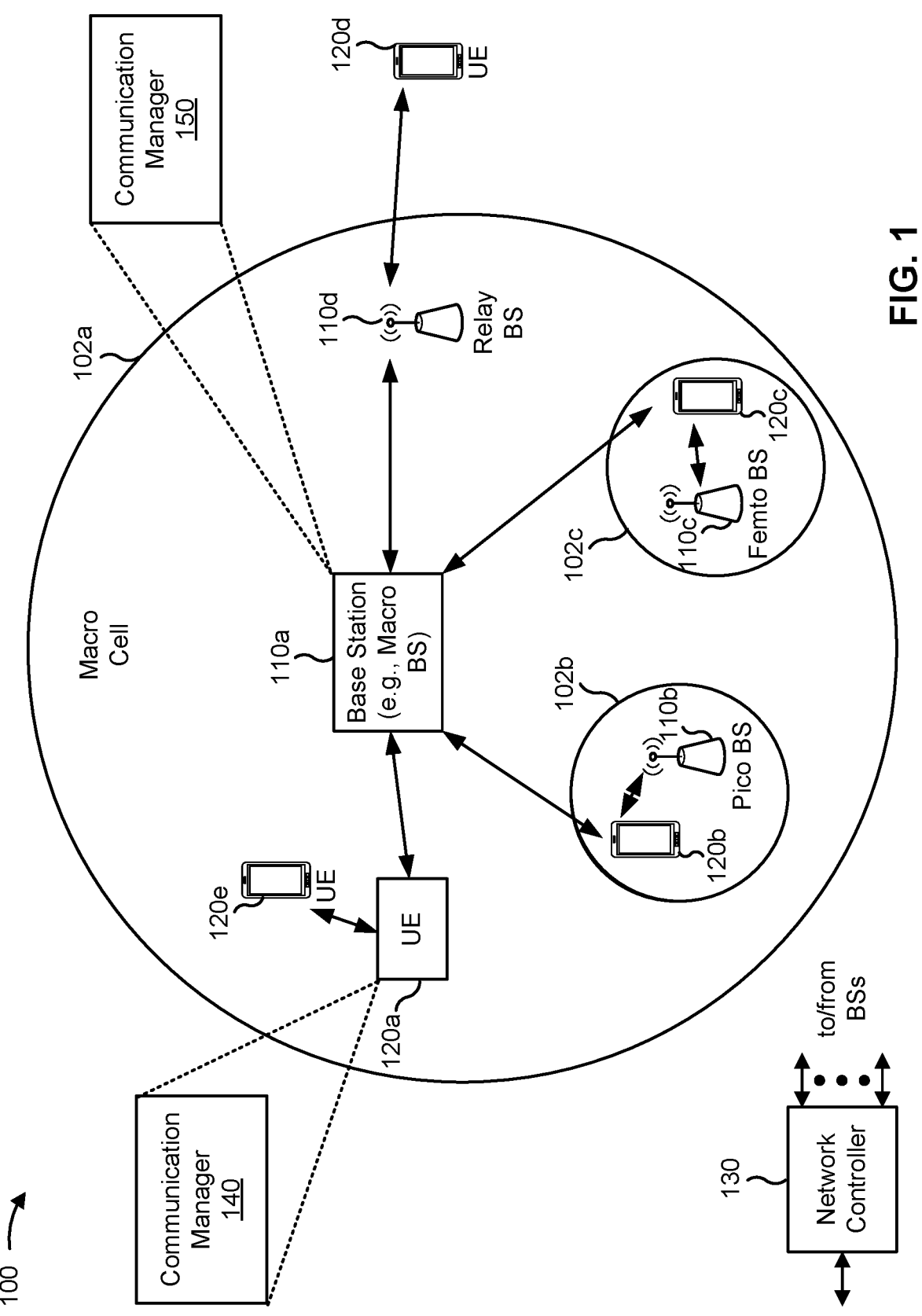
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4a or FR4-1, and/or FR5, or may be within the EHF band. It is contemplated that the frequencies included in these operating bands (e.g., FR1, FR2, FR3, FR4, FR4a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a physical uplink control channel (PUCCH) resource set configuration including a first subset of PUCCH resources and a second subset of PUCCH resources, wherein PUCCH resources in the first subset of PUCCH resources are configured with a parameter per PUCCH resource, and wherein PUCCH resources in the second subset of PUCCH resources do not include a parameter per PUCCH resource; identify a parameter to be used for transmitting a PUCCH communication based at least in part on the PUCCH resource set configuration; and transmit one or more repetitions of the PUCCH communication based at least in part on the parameter. Additionally, or alternatively, the communication manager 140 may perform one or more other operations described herein.

In some aspects, the base station 110 may include a communication manager 150. As described in more detail elsewhere herein, the communication manager 150 may transmit a PUCCH resource set configuration including a first subset of PUCCH resources and a second subset of PUCCH resources, wherein PUCCH resources in the first subset of PUCCH resources are configured with a parameter per PUCCH resource, and wherein PUCCH resources in the second subset of PUCCH resources do not include a parameter per PUCCH resource; identify a parameter to be used for receiving a PUCCH communication based at least in part on the PUCCH resource set configuration; and receive one or more repetitions of the PUCCH communication based at least in part on the parameter. Additionally, or alternatively, the communication manager 150 may perform one or more other operations described herein.

As indicated above, FIG. 1 is provided as an example. Other examples may differ from what is described with regard to FIG. 1.

Figure 2:
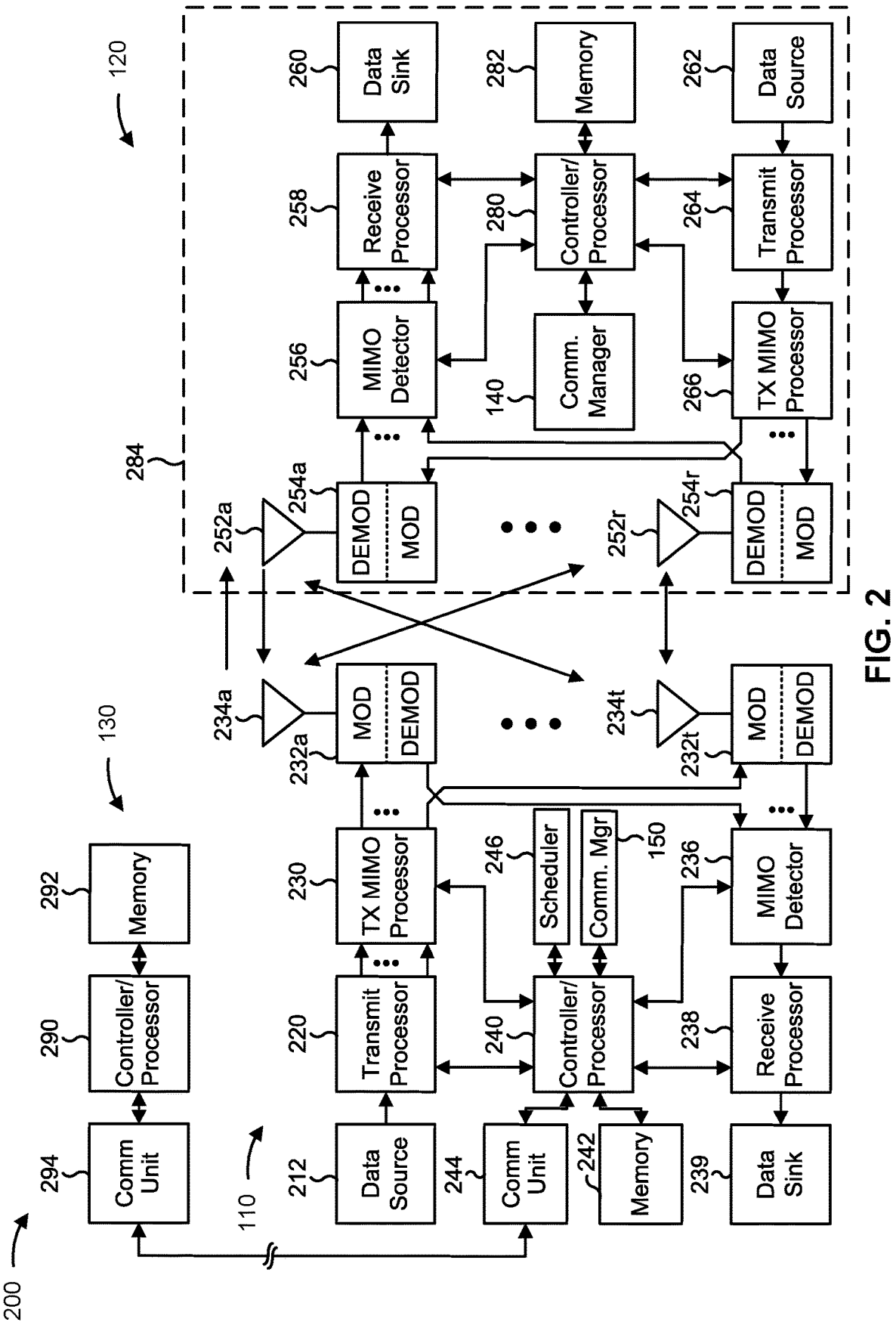
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-12).

The controller/processor 240 of the base station 110, the controller/processor 280 of the UE 120, and/or any other component(s) of FIG. 2 may perform one or more techniques associated with a PUCCH resource set with or without a parameter per PUCCH resource, as described in more detail elsewhere herein. For example, the controller/processor 240 of the base station 110, the controller/processor 280 of the UE 120, and/or any other component(s) of FIG. 2 may perform or direct operations of, for example, process 400 of FIG. 4, process 500 of FIG. 5, process 900 of FIG. 9, process 1000 of FIG. 10 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some examples, executing instructions may include running the instructions, converting the instructions, compiling the instructions, and/or interpreting the instructions, among other examples.

In some aspects, the UE 120 includes means for receiving a PUCCH resource set configuration including a first subset of PUCCH resources and a second subset of PUCCH resources, wherein PUCCH resources in the first subset of PUCCH resources are configured with a parameter per PUCCH resource, and wherein PUCCH resources in the second subset of PUCCH resources do not include a parameter per PUCCH resource; means for identifying a parameter to be used for transmitting a PUCCH communication based at least in part on the PUCCH resource set configuration; and/or means for transmitting one or more repetitions of the PUCCH communication based at least in part on the parameter. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting a PUCCH resource set configuration including a first subset of PUCCH resources and a second subset of PUCCH resources, wherein PUCCH resources in the first subset of PUCCH resources are configured with a parameter per PUCCH resource, and wherein PUCCH resources in the second subset of PUCCH resources do not include a parameter per PUCCH resource; means for identifying a parameter to be used for receiving a PUCCH communication based at least in part on the PUCCH resource set configuration; and/or means for receiving one or more repetitions of the PUCCH communication based at least in part on the parameter. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In some wireless communication systems, PUCCH repetition may be used to improve reliability and coverage of the PUCCH, such as for ultra-reliable low-latency communication (URLLC) or for UEs 120 located in a geographic area with poor channel conditions (e.g., a cell edge). When repetitions are used, a transmitter repeats transmission of a communication multiple times. For example, a UE 120 may transmit an initial PUCCH communication and may repeat transmission of (e.g., may retransmit) that PUCCH communication one or more times. In some aspects, a repeated transmission (sometimes referred to as a retransmission) may include the same encoded bits (e.g., information bits and parity bits) as the initial transmission and/or as another repeated transmission (e.g., where a same redundancy version is used across repetitions). Alternatively, a repeated transmission may include different encoded bits (e.g., a different combination of information bits and/or parity bits) than the initial transmission and/or another repeated transmission (e.g., where different redundancy versions are used across repetitions).

As used herein, the term "repetition" is used to refer to the initial communication and is also used to refer to a repeated transmission of the initial communication. For example, if the UE 120 is configured to transmit four repetitions, then the UE 120 may transmit an initial transmission and may transmit three repeated transmissions of that initial transmission. Thus, each transmission (regardless of whether the transmission is an initial transmission or a retransmission) is counted as a repetition. Further, the term "repetition factor" is used to refer to an indication of a quantity of repetitions of a communication that a UE 120 is to transmit. For example, if the UE 120 identifies a repetition factor of four for a given uplink communication, then the UE 120 may determine that the UE 120 is to transmit four repetitions of the given uplink communication. A repetition may be transmitted in a transmission occasion, which is sometimes referred to as a transmission instance.

In some wireless communication systems, a repetition factor to be used for a PUCCH communication (herein referred to as a PUCCH repetition factor) can be dynamically indicated. For example, a UE 120 can be configured to identify a PUCCH resource to be used for a PUCCH communication, from a pool of 16 PUCCH resources configured for the UE 120, using a combination of a PUCCH resource indicator (PRI) and an allocated control channel element (CCE). The PRI is a three-bit field carried in a physical downlink control channel (PDCCH) in downlink control information (DCI) used to allocate a physical downlink shared channel (PDSCH). The allocated CCE may be, for example, a first CCE location of the PDCCH. An index of the allocated CCE is used to calculate a single bit of information. The combined set of 4 bits—three bits from the PRI and one bit from the allocated CCE—is used to identify a PUCCH resource from the pool of 16 PUCCH resources. Here, a repetition factor can be configured for each PUCCH resource in the pool of 16 PUCCH resources, meaning that the PUCCH repetition factor can be dynamically indicated through the PRI in DCI.

However, a maximum quantity of PUCCH resources that can be indicated in this manner is limited. For example, a size of the pool of PUCCH resources (e.g., 16 PUCCH resources) may be insufficient to enable division of PUCCH resources based on different possible repetition factors (e.g., 1, 2, 4, 8 or the like) without significantly reducing flexibility for a base station 110 when selecting a PUCCH resource. What is needed is a technique that enables dynamic indication of a PUCCH repetition factor without increasing a length of the PRI or reducing flexibility of PUCCH resource selection (i.e., avoiding too few PUCCH resources being associated with each repetition factor due to dividing all PUCCH resources among the possible repetition factor options).

Some techniques and apparatuses described herein enable a PUCCH resource set with or without a repetition factor per PUCCH resource. In some aspects, a UE 120 may receive a PUCCH resource set configuration including a first subset of PUCCH resources and a second subset of PUCCH resources. Here, PUCCH resources in the first subset of PUCCH resources are configured with a repetition factor per PUCCH resource, and PUCCH resources in the second subset of PUCCH resources do not include a repetition factor per PUCCH resource. The UE 120 may identify a repetition factor to be used for a PUCCH communication based at least in part on the PUCCH resource set configuration, and may transmit one or more repetitions of the PUCCH communication based at least in part on the repetition factor. Additional details are provided below. In this way, a PUCCH repetition factor can be dynamically indicated without a need to increase a length of the PRI or to significantly reduce flexibility of PUCCH resource selection, meaning that the improved reliability and coverage enabled by dynamic indication of a PUCCH repetition factor can be provided without significantly impacting overhead or flexibility.

FIG. 3 is a diagram illustrating an example 300 associated with a PUCCH resource set with or without a repetition factor per PUCCH resource, in accordance with the present disclosure. As shown in FIG. 3, example 300 includes communication between a base station 110 and a UE 120. In some aspects, the base station 110 and the UE 120 may be included in a wireless network, such as a wireless network 100. The base station 110 and the UE 120 may communicate via a wireless access link, which may include an uplink and a downlink.

As shown in FIG. 3, by reference 305, the base station 110 may transmit, and the UE 120 may receive, a PUCCH resource set configuration including a first subset of PUCCH resources and a second subset of PUCCH resources. The PUCCH resource set configuration is a configuration indicating a set of PUCCH resources that may be used by the UE 120 in order to transmit a PUCCH communication. That is, the PUCCH resource set configuration includes information associated with a set of PUCCH resources, where a given PUCCH communication may be transmitted by the UE 120 using a PUCCH resource from the set of PUCCH resources. In some aspects, the PUCCH resource configuration includes a first subset of PUCCH resources and a second subset of PUCCH resources.

In some aspects, PUCCH resources in the first subset of PUCCH resources are configured with a repetition factor per PUCCH resource. That is, the first subset of PUCCH resources comprises one or more PUCCH resources, where each PUCCH resource in the first subset of PUCCH resources is configured with a respective repetition factor (e.g., 1, 2, 4, 8, or the like). In some aspects, PUCCH resources in the second subset of PUCCH resources are configured without (i.e., do not include) a repetition factor per PUCCH resource. That is, the second subset of PUCCH resources comprises one or more PUCCH resources for which no repetition factor is configured.

As an example, the PUCCH resource set configuration may indicate eight PUCCH resources corresponding to indices 0 through 7. Here, the first subset of PUCCH resources may comprise PUCCH resources corresponding to indices 5 through 7, and the second subset of PUCCH resources may comprise PUCCH resources corresponding to indices 0 through 4. In this example, the PUCCH resource associated with index 5 may be configured with a repetition factor 2, the PUCCH resource associated with index 6 may be configured with repetition factor 4, and the PUCCH resource associated with index 7 may be configured with repetition factor 8. Further, the PUCCH resources corresponding to indices 0, 1, 2, 3, and 4 may be configured without an associated repetition factor.

As shown by reference 310, the UE 120 may identify a repetition factor to be used for transmitting a PUCCH communication based at least in part on the PUCCH resource set configuration. For example, the UE 120 may identify a PUCCH resource to be used for transmitting a PUCCH communication. In some aspects, the UE 120 may identify the PUCCH resource to be used for transmitting the PUCCH communication based on, for example, a PRI (e.g., received in DCI), a location of a CCE, a dynamic indication, or some combination thereof. Here, the PUCCH resource identified for use in transmitting the PUCCH communication may be a PUCCH resource included in the PUCCH resource set configured by the PUCCH resource set configuration. Next, the UE 120 may identify whether or not the PUCCH resource is configured with a repetition factor in the PUCCH resource set configuration (i.e., whether the identified PUCCH resource is in the first subset of PUCCH resources or is in the second subset of PUCCH resources).

In some aspects, if the PUCCH resource to be used for transmitting the PUCCH communication is included in the first subset of PUCCH resources, then the UE 120 may identify the repetition factor based at least in part on a repetition factor associated with the PUCCH resource as configured in the PUCCH resource set configuration. That is, the UE 120 may identify that a PUCCH resource in the first subset of PUCCH resources is to be used for transmitting the PUCCH communication and, when identifying the repetition factor, the UE 120 may identify the repetition factor as a repetition factor associated with the PUCCH resource in the PUCCH resource set configuration. As a particular example, and continuing with the example above, the UE 120 may receive a PRI indicating that the PUCCH resource associated with index 7 is to be used for the PUCCH communication. Here, the UE 120 may determine that the PUCCH resource associated with index 7 has a repetition factor configured in the PUCCH resource set configuration (e.g., a repetition factor of 8) and, therefore, may identify the repetition factor for the PUCCH communication as 8.

Conversely, in some aspects, if the PUCCH resource to be used for transmitting the PUCCH communication is included in the second subset of PUCCH resources, then the UE 120 may identify the repetition factor in another manner, such as based at least in part on a repetition factor configured for a PUCCH format to be used for the PUCCH communication. That is, the UE 120 may identify that a PUCCH resource in the second subset of PUCCH resources is to be used for transmitting the PUCCH communication and, when identifying the repetition factor, may identify the repetition factor based at least in part on information not associated with the PUCCH resource set configuration, such as a repetition factor configured for a PUCCH format to be used for the PUCCH communication. As a particular example, and continuing with the example above, the UE 120 may receive a PRI indicating that the PUCCH resource associated with index 3 is to be used for the PUCCH communication. Here, the UE 120 may determine that the PUCCH resource associated with index 3 is not configured with a repetition factor in the PUCCH resource set configuration and, therefore, may identify the repetition factor for the PUCCH communication as a (default) repetition factor configured for a PUCCH format to be used for transmitting the PUCCH communication.

In some aspects, the PUCCH communication includes acknowledgement information associated with a scheduled PDSCH communication. That is, in some aspects, the PUCCH communication may be a PUCCH communication associated with carrying an acknowledgment (ACK) or a negative ACK (NACK) for a scheduled PDSCH (e.g., a PDSCH scheduled by the PDCCH carrying the DCI including the PRI).

In some aspects, the PUCCH communication includes acknowledgement information associated with a semi-persistent scheduling (SPS) communication. That is, in some aspects, the PUCCH communication may be a PUCCH communication associated with carrying an ACK or a NACK for an SPS communication.

In some aspects, the PUCCH communication includes a scheduling request (SR). That is, in some aspects, the PUCCH communication may be an SR.

In some aspects, the PUCCH communication includes channel state information (CSI). That is, in some aspects, the PUCCH communication may be a PUCCH communication associated with carrying CSI.

As shown by reference 315, the base station 110 may identify a repetition factor to be used for transmitting a PUCCH communication based at least in part on the PUCCH resource set configuration. For example, the base station 110 may select a PUCCH resource to be used by the UE 120 for transmitting the PUCCH communication, and may indicate the PUCCH resource to the UE 120 as described above. In some aspects, the base station 110 may select the PUCCH resource based at least in part on a repetition factor to be used for the PUCCH communication (e.g., the base station 110 can select the PUCCH resource so as to cause the UE 120 to use a repetition factor desired by the base station 110). Next, in association with receiving the PUCCH communication, the base station 110 may identify the repetition factor associated with the PUCCH communication. In some aspects, the base station 110 may identity the repetition factor based at least in part on the PUCCH resource set configuration associated with the UE 120 (e.g., in a manner similar to that of the UE 120 described above).

For example, in association with receiving the PUCCH communication, the base station 110 may determine whether the PUCCH resource to be used by the UE 120 for transmitting the PUCCH communication is in the first subset of PUCCH resources or is in the second subset of PUCCH resources and may identify the repetition factor accordingly (e.g., in a manner similar to that of the UE 120). The base station 110 may then receive the one or more repetitions of the PUCCH communication according to the identified repetition factor.

As shown by reference 320, the UE 120 may transmit, and the base station 110 may receive, one or more repetitions of the PUCCH communication based at least in part on the repetition factor. For example, the UE 120 may transmit one or more repetitions of the PUCCH communication in the PUCCH resource and according to the identified repetition factor, and the base station 110 may receive the one or more repetitions of the PUCCH communication, accordingly.

As indicated above, FIG. 3 is provided as an example. Other examples may differ from what is described with respect to FIG. 3.

FIG. 4 is a diagram illustrating an example process 400 performed, for example, by a UE, in accordance with the present disclosure. Example process 400 is an example where the UE (e.g., UE 120) performs operations associated with a PUCCH resource set with or without a repetition factor per PUCCH resource.

As shown in FIG. 4, in some aspects, process 400 may include receiving a PUCCH resource set configuration including a first subset of PUCCH resources and a second subset of PUCCH resources, wherein PUCCH resources in the first subset of PUCCH resources are configured with a repetition factor per PUCCH resource, and wherein PUCCH resources in the second subset of PUCCH resources do not include a repetition factor per PUCCH resource (block 410). For example, the UE (e.g., using communication manager 140 and/or reception component 602, depicted in FIG. 6) may receive a PUCCH resource set configuration including a first subset of PUCCH resources and a second subset of PUCCH resources, wherein PUCCH resources in the first subset of PUCCH resources are configured with a repetition factor per PUCCH resource, and wherein PUCCH resources in the second subset of PUCCH resources do not include a repetition factor per PUCCH resource, as described above.

As further shown in FIG. 4, in some aspects, process 400 may include identifying a repetition factor to be used for transmitting a PUCCH communication based at least in part on the PUCCH resource set configuration (block 420). For example, the UE (e.g., using communication manager 140 and/or identification component 608, depicted in FIG. 608) may identify a repetition factor to be used for transmitting a PUCCH communication based at least in part on the PUCCH resource set configuration, as described above.

As further shown in FIG. 4, in some aspects, process 400 may include transmitting one or more repetitions of the PUCCH communication based at least in part on the repetition factor (block 430). For example, the UE (e.g., using communication manager 140 and/or transmission component 604, depicted in FIG. 6) may transmit one or more repetitions of the PUCCH communication based at least in part on the repetition factor, as described above.

Process 400 may include additional aspects, such as any single aspect or any combination of aspects described below and/or in connection with one or more other processes described elsewhere herein.

In a first aspect, process 400 includes identifying that a PUCCH resource in the first subset of PUCCH resources is to be used for transmitting the PUCCH communication, wherein identifying the repetition factor comprises identifying the repetition factor based at least in part on a repetition factor associated with the PUCCH resource as configured in the PUCCH resource set configuration.

In a second aspect, alone or in combination with the first aspect, process 400 includes identifying that a PUCCH resource in the second subset of PUCCH resources is to be used for transmitting the PUCCH communication, wherein identifying the repetition factor comprises identifying the repetition factor based at least in part on a repetition factor configured for a PUCCH format to be used for the PUCCH communication.

In a third aspect, alone or in combination with one or more of the first and second aspects, process 400 includes identifying a PUCCH resource to be used for transmitting the PUCCH communication based at least in part on at least one of a PRI, a location of a CCE, or a dynamic indication.

In a fourth aspect, alone or in combination with one or more of the first through third aspects, the PUCCH communication includes acknowledgement information associated with a scheduled PDSCH communication.

In a fifth aspect, alone or in combination with one or more of the first through fourth aspects, the PUCCH communication includes acknowledgement information associated with an SPS communication.

In a sixth aspect, alone or in combination with one or more of the first through fifth aspects, the PUCCH communication includes an SR.

In a seventh aspect, alone or in combination with one or more of the first through sixth aspects, the PUCCH communication includes CSI.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram illustrating an example process 500 performed, for example, by a base station, in accordance with the present disclosure. Example process 500 is an example where the base station (e.g., base station 110) performs operations associated with a PUCCH resource set with or without a repetition factor per PUCCH resource.

As shown in FIG. 5, in some aspects, process 500 may include transmitting a PUCCH resource set configuration including a first subset of PUCCH resources and a second subset of PUCCH resources, wherein PUCCH resources in the first subset of PUCCH resources are configured with a repetition factor per PUCCH resource, and wherein PUCCH resources in the second subset of PUCCH resources do not include a repetition factor per PUCCH resource (block 510). For example, the base station (e.g., using communication manager 150 and/or transmission component 704, depicted in FIG. 7) may transmit a PUCCH resource set configuration including a first subset of PUCCH resources and a second subset of PUCCH resources, wherein PUCCH resources in the first subset of PUCCH resources are configured with a repetition factor per PUCCH resource, and wherein PUCCH resources in the second subset of PUCCH resources do not include a repetition factor per PUCCH resource, as described above.

As further shown in FIG. 5, in some aspects, process 500 may include identifying a repetition factor to be used for receiving a PUCCH communication based at least in part on the PUCCH resource set configuration (block 520). For example, the base station (e.g., using communication manager 150 and/or identification component 708, depicted in FIG. 7) may identify a repetition factor to be used for receiving a PUCCH communication based at least in part on the PUCCH resource set configuration, as described above.

As further shown in FIG. 5, in some aspects, process 500 may include receiving one or more repetitions of the PUCCH communication based at least in part on the repetition factor (block 530). For example, the base station (e.g., using communication manager 150 and/or reception component 702, depicted in FIG. 7) may receive one or more repetitions of the PUCCH communication based at least in part on the repetition factor, as described above.

Process 500 may include additional aspects, such as any single aspect or any combination of aspects described below and/or in connection with one or more other processes described elsewhere herein.

In a first aspect, process 500 includes identifying that a PUCCH resource in the first subset of PUCCH resources is to be used for transmitting the PUCCH communication, wherein identifying the repetition factor comprises identifying the repetition factor based at least in part on a repetition factor associated with the PUCCH resource as configured in the PUCCH resource set configuration.

In a second aspect, alone or in combination with the first aspect, process 500 includes identifying that a PUCCH resource in the second subset of PUCCH resources is to be used for transmitting the PUCCH communication, wherein identifying the repetition factor comprises identifying the repetition factor based at least in part on a repetition factor configured for a PUCCH format to be used for the PUCCH communication.

In a third aspect, alone or in combination with one or more of the first and second aspects, the PUCCH communication includes acknowledgement information associated with a scheduled PDSCH communication.

In a fourth aspect, alone or in combination with one or more of the first through third aspects, the PUCCH communication includes acknowledgement information associated with an SPS communication.

In a fifth aspect, alone or in combination with one or more of the first through fourth aspects, the PUCCH communication includes an SR.

In a sixth aspect, alone or in combination with one or more of the first through fifth aspects, the PUCCH communication includes CSI.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
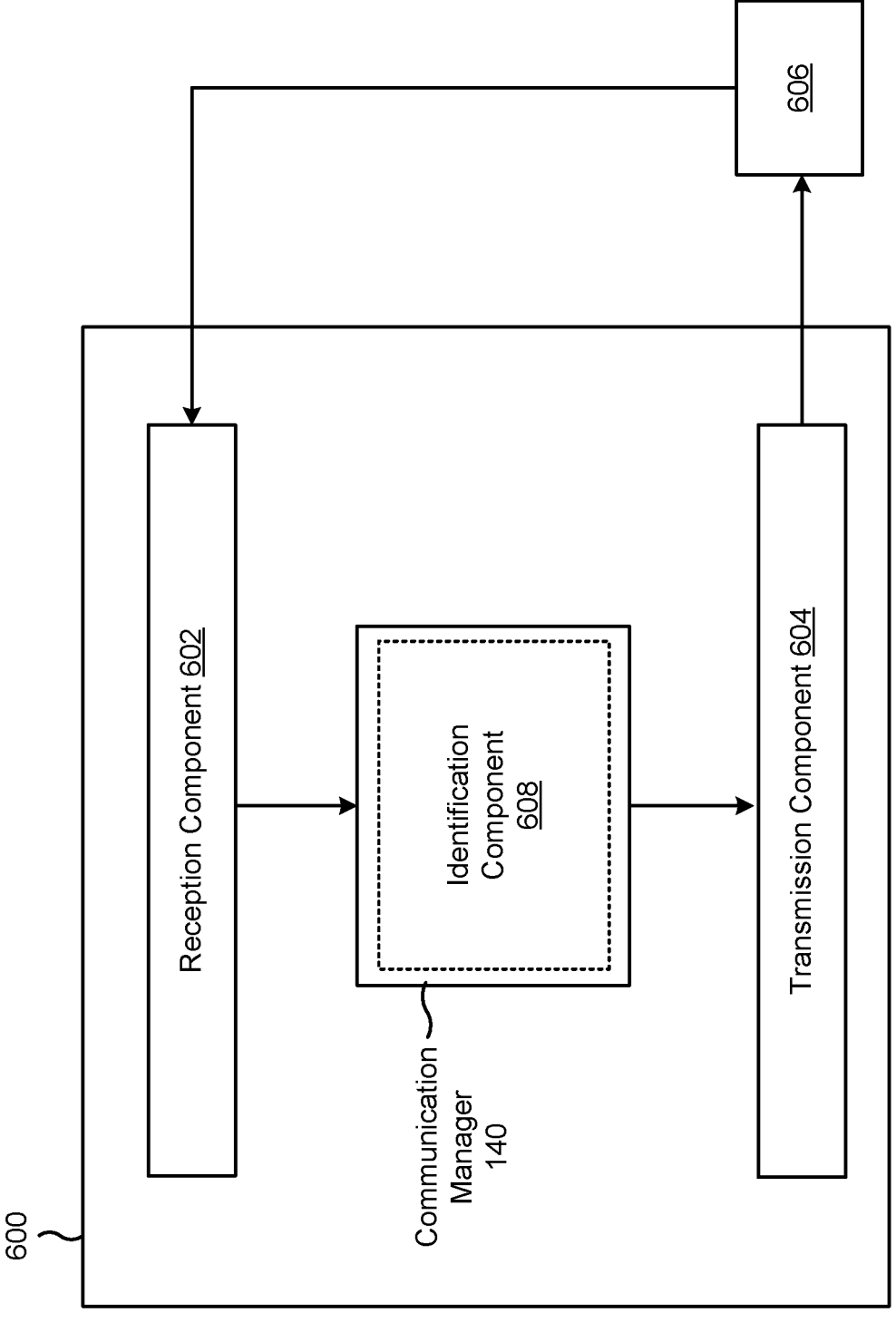
FIGS. 6 and 7 are diagrams of example apparatuses for wireless communication, in accordance with the present disclosure.

FIG. 6 is a diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include an identification component 608, among other examples.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The reception component 602 may receive a PUCCH resource set configuration including a first subset of PUCCH resources and a second subset of PUCCH resources, wherein PUCCH resources in the first subset of PUCCH resources are configured with a repetition factor per PUCCH resource, and wherein PUCCH resources in the second subset of PUCCH resources do not include a repetition factor per PUCCH resource. The identification component 608 may identify a repetition factor to be used for transmitting a PUCCH communication based at least in part on the PUCCH resource set configuration. The transmission component 604 may transmit one or more repetitions of the PUCCH communication based at least in part on the repetition factor.

The identification component 608 may identify that a PUCCH resource in the first subset of PUCCH resources is to be used for transmitting the PUCCH communication.

The identification component 608 may identify that a PUCCH resource in the second subset of PUCCH resources is to be used for transmitting the PUCCH communication.

The identification component 608 may identify a PUCCH resource to be used for transmitting the PUCCH communication based at least in part on at least one of a PRI, a location of a CCE, or a dynamic indication.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
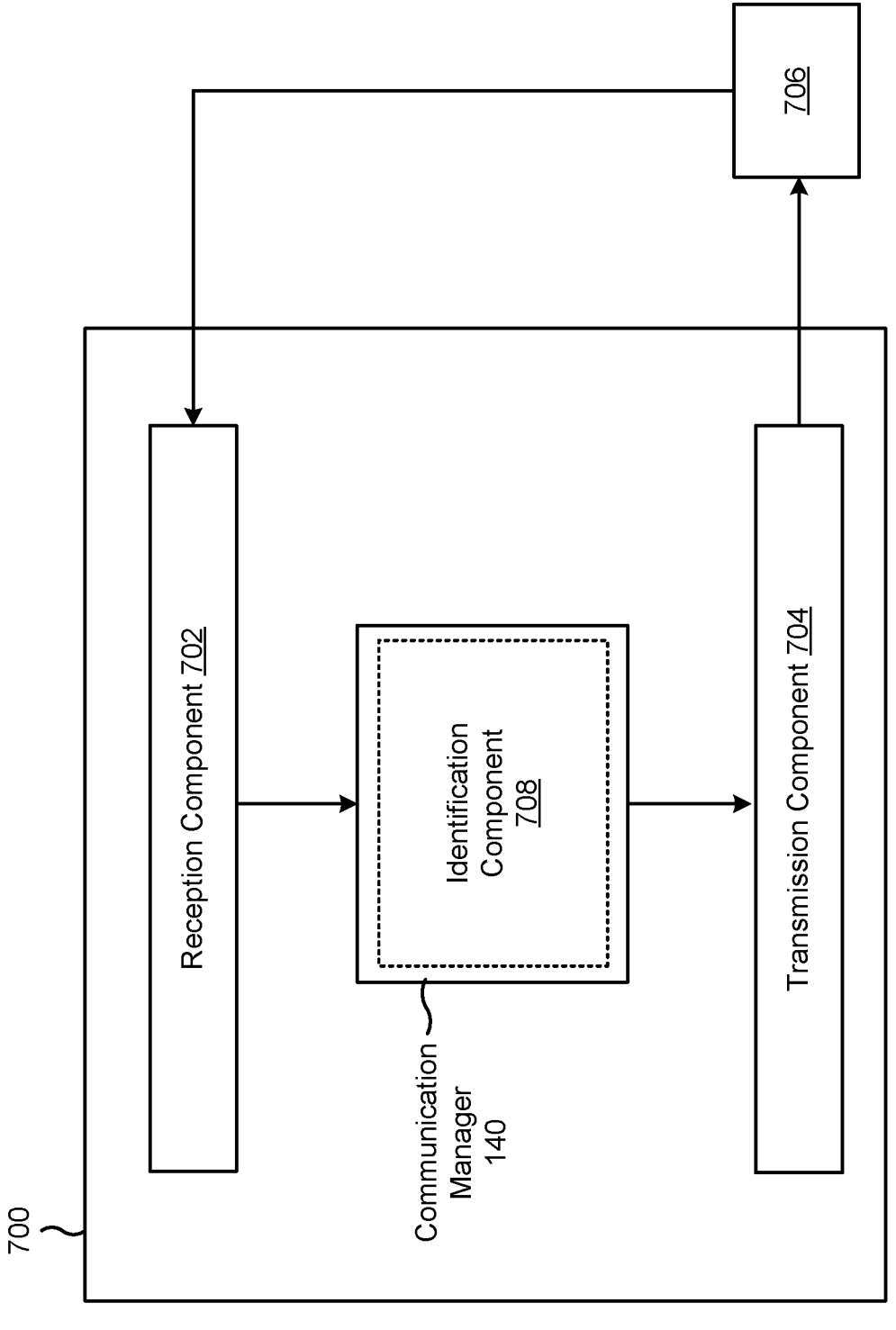

FIG. 7 is a diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 150. The communication manager 150 may include an identification component 708, among other examples.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5. In some aspects, the apparatus 700 and/or one or more components shown in FIG. 7 may include one or more components of the base station described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the base station described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the base station described in connection with FIG. 2. In some aspects, the transmission component 704 may be co-located with the reception component 702 in a transceiver.

The transmission component 704 may transmit a PUCCH resource set configuration including a first subset of PUCCH resources and a second subset of PUCCH resources, wherein PUCCH resources in the first subset of PUCCH resources are configured with a repetition factor per PUCCH resource, and wherein PUCCH resources in the second subset of PUCCH resources do not include a repetition factor per PUCCH resource. The identification component 708 may identify a repetition factor to be used for receiving a PUCCH communication based at least in part on the PUCCH resource set configuration. The reception component 702 may receive one or more repetitions of the PUCCH communication based at least in part on the repetition factor.

The identification component 708 may identify that a PUCCH resource in the first subset of PUCCH resources is to be used for transmitting the PUCCH communication.

The identification component 708 may identify that a PUCCH resource in the second subset of PUCCH resources is to be used for transmitting the PUCCH communication.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

A base station may dynamically change a PUCCH repetition factor by configuring repetition on a per PUCCH resource set basis. Similarly, the base station may dynamically change DMRS bundling for PUCCH repetition. When frequency hopping is enabled and the base station changes DMRS bundling for PUCCH repetition, maintaining the same frequency hopping configuration may result in issues for communications between the base station and a UE. For example, an inter-slot frequency hopping pattern that alternates based on even slots and odd slots may not be suitable for some DMRS bundling configurations. One issue may be that a maximum quantity of PUCCH resources identifiable by a PRI may not be large enough to accommodate all available PUCCH resources with different repetition factors. Increasing a size of the PRI may allow additional PUCCH resources to be indicated, but results in excessive use of network resources to convey larger PRIs.

Some aspects described herein enable dynamic indication of frequency hopping by enabling a base station to configure a mixed PUCCH resource set with and without inter-slot frequency hopping configured on a per PUCCH resource basis. For example, the base station may configure a PUCCH resource set that includes a first PUCCH resource subset configured for inter-slot frequency hopping per PUCCH resource and a second PUCCH resource subset configured without an associated configuration for frequency hopping on a per PUCCH resource basis. In this case, the base station may use an indicator (e.g., a PRI, CCE location, or other dynamic indication) to identify a PUCCH resource of the PUCCH resource set as being configured for inter-slot frequency hopping per PUCCH resource (e.g., in a first PUCCH resource subset) or as being configured without an associated configuration for frequency hopping on a per PUCCH resource basis. Based at least in part on whether the PUCCH resource is in the first PUCCH resource subset or the second PUCCH resource subset, a UE may determine whether to perform inter-slot frequency hopping for transmission of one or more PUCCH repetitions. In this way, the UE and the base station enable dynamic indication of frequency hopping without increasing a length of a PRI or other indicator and without constraining a flexibility of PUCCH resource selection. In this way, the UE and the base station improve communication relative to not allowing dynamic indication of frequency hopping, extending a PRI or other indicator, or constraining a flexibility of PUCCH resource selection, among other examples.

Figure 8:
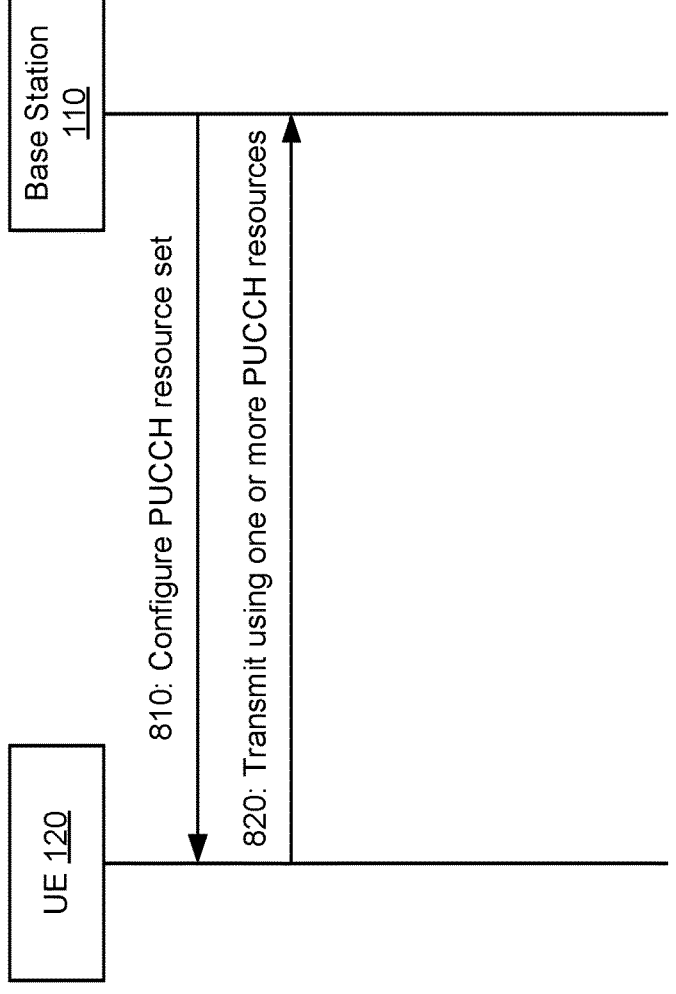
FIG. 8 is a diagram illustrating an example associated with mixed physical uplink control channel (PUCCH) resource set usage, in accordance with the present disclosure.

FIG. 8 is a diagram illustrating an example 800 associated with mixed PUCCH resource set usage, in accordance with the present disclosure. As shown in FIG. 8, example 800 includes communication between a base station 110 and a UE 120. In some aspects, base station 110 and UE 120 may be included in a wireless network, such as wireless network 100. Base station 110 and UE 120 may communicate via a wireless access link, which may include an uplink and a downlink.

As further shown in FIG. 8, and by reference number 810, base station 110 may configure a PUCCH resource set. For example, base station 110 may transmit, to UE 120, signaling identifying a PUCCH resource set. In this case, the PUCCH resource set may include a first PUCCH resource subset and a second PUCCH resource subset. The first PUCCH resource subset may include one or more PUCCH resources that are configured with a configuration for inter-slot frequency hopping per PUCCH resource. In contrast, the second PUCCH resource set are configured without an associated configuration for inter-slot frequency hopping per PUCCH resource. In some aspects, the first PUCCH resource subset may be associated with a configuration of one or more parameters related to frequency hopping and/or frequency hops performed when frequency hopping. For example, UE 120 may receive signaling identifying a starting resource block (e.g., a startingPRB parameter) for the first PUCCH resource subset and/or for a respective PUCCH resource of the first PUCCH resource subset, a second resource block (e.g., a secondHopPRB parameter) for the first PUCCH resource subset and/or for a respective PUCCH resource of the first PUCCH resource subset (e.g., in a different symbol or resource location than the starting resource block), or a frequency offset between frequency hops, among other examples.

Additionally, or alternatively, UE 120 may receive signaling identifying a frequency hopping pattern for the first PUCCH resource subset and/or for a respective PUCCH resource of the first PUCCH resource subset. Examples of frequency hopping patterns may include ABAB-type (i.e., alternating) frequency hopping patterns (in which A represents use of a first resource block location within slots and B represents use of a second resource block location within slots), an AABB-type (i.e., consecutive blocks) frequency hopping pattern, a slot index-based frequency hopping pattern (where resource block locations correspond to whether an index of a slot is odd or even or to a magnitude of the index of the slot), or any other type of pattern. Although described herein in terms of two hops, any other quantity of hops (e.g., three or more hops) may be possible for a frequency hopping pattern.

In some aspects, UE 120 may determine the frequency hopping pattern for the first PUCCH resource subset (e.g., for frequency hopping per PUCCH resource) based at least in part on another configured parameter. For example, UE 120 may use a first frequency hopping pattern when DMRS bundling is activated or enabled for a group of PUCCH resources and a second frequency hopping pattern when DMRS bundling is not activated or enabled for a group of PUCCH resources. In this case, when UE 120 receives a PRI indicating a deactivation or activation of DMRS bundling, UE 120 may alter an associated frequency hopping pattern (e.g., change from a first frequency hopping pattern to a second frequency hopping pattern). Additionally, or alternatively, UE 120 may deactivate frequency hopping based at least in part on the PRI indicating activation of DMRS bundling. Additionally, or alternatively, UE 120 may receive another type of signaling configuring or activating/deactivating DMRS bundling (e.g., layer 1 (L1) or layer 2 (L2) signaling, such as DCI or a downlink MAC-CE), and may alter an interpretation of a frequency hopping configuration (e.g., by changing frequency hopping patterns, frequency hopping parameters, whether to perform frequency hopping based at least in part on PUCCH format, as described above, etc.).

In some aspects, UE 120 may determine that frequency hopping is to be enabled based at least in part on an indication received from base station 110. For example, UE 120 may determine that frequency hopping is enabled for the first PUCCH resource subset and/or for a respective PUCCH resource of the first PUCCH resource subset based at least in part on the configuration of the first PUCCH resource subset and/or for a respective PUCCH resource of the first PUCCH resource subset. Additionally, or alternatively, UE 120 may determine that frequency hopping is enabled for one or more PUCCH resources of the second PUCCH resource subset. For example, when an indication (e.g., a PRI or CCE location) indicates a particular PUCCH resource that does not have a configuration for frequency hopping per PUCCH resource, UE 120 may determine that frequency hopping is enabled for a PUCCH format of the particular PUCCH resource in the second PUCCH resource subset based at least in part on other factors. For example, UE 120 may determine that frequency hopping is to be enabled for the particular PUCCH resource based at least in part on the format of the particular PUCCH resource, despite the particular PUCCH resource not having an associated configuration for frequency hopping per PUCCH resource. In this case, UE 120 may use received configuration information associated with configuring frequency hopping for different PUCCH formats and may determine whether to enable frequency hopping for the particular PUCCH resource based at least in part on a PUCCH format of the particular PUCCH resource. In other words, if a PUCCH resource is configured without an associated frequency hopping configuration on a per PUCCH resource basis (e.g., a resource of the second PUCCH resource subset), then whether frequency hopping is enabled for the PUCCH resource may be based at least in part on a PUCCH format associated with the PUCCH resource. For example, frequency hopping for the PUCCH resource may be enabled for a first PUCCH format and frequency hopping for the PUCCH resource may be disabled for a second PUCCH format.

In some aspects, UE 120 may determine that frequency hopping is to be disabled based at least in part on an indication received from base station 110. For example, a PUCCH resource may be configured (e.g., on a per PUCCH resource basis based on a PRI) to be disabled for frequency hopping. The PUCCH resource may be disabled for frequency hopping irrespective or independent of the PUCCH format of the PUCCH resource. For example, if a PUCCH resource is configured with a repetition factor to be used without frequency hopping, then the PUCCH resource will be disabled from frequency hopping even if the PUCCH format of the PUCCH resource enables frequency hopping as a default.

As further shown in FIG. 8, and by reference number 820, UE 120 may transmit using one or more PUCCH resources. For example, UE 120 may transmit repetitions of a PUCCH communication using frequency hopping in the first PUCCH resource subset, or transmit repetitions of a PUCCH communication using frequency hopping in the first PUCCH resource subset and the second PUCCH resource subset. Additionally, or alternatively, UE 120 may transmit repetitions of a PUCCH communication using frequency hopping in PUCCH resources without a configuration for frequency hopping on a per PUCCH resource basis (e.g., the second PUCCH resource subset), but that are associated with a particular PUCCH format for which frequency hopping is configured. Additionally, or alternatively, UE 120 may transmit one or more repetitions of a PUCCH communication without frequency hopping (e.g., in a PUCCH resource for which frequency hopping is not configured or when frequency hopping is to be disabled, such as when DMRS bundling is enabled).

As an illustrative example, UE 120 may be configured with a PUCCH resource set, which may include 8 PUCCH resources, with resources 0, 1, 2, and 3 being configured without an associated repetition factor, resources 4 and 5 configured with repetition factors 2 and 4, respectively (without a configuration for frequency hopping), resource 6 configured with repetition factor 4 with enabled frequency hopping, and resource 7 configured with repetition factor 4 with disabled frequency hopping. In this case, UE 120 may receive a PRI indicating resource 7, and UE 120 may transmit using repetition factor 4 (e.g., 4 PUCCH repetitions) without frequency hopping (e.g., regardless of PUCCH format configuration as a result of frequency hopping being configured but disabled). In contrast, UE 120 may receive a PRI indicating resource 6, and UE 120 may transmit using repetition factor 4 with frequency hopping (e.g., with parameters indicated in a configuration for PUCCH resource 6). In further contrast, UE 120 may receive a PRI indicating resource 5, and may transmit using repetition factor 4 with frequency hopping being dependent on a PUCCH format configuration (e.g., as a result of resource 5 being configured without a configuration for frequency hopping).

In some aspects, UE 120 may transmit a particular format of PUCCH conveying a particular type of information. For example, UE 120 may transmit a PUCCH conveying a hybrid automatic repeat request (HARQ) acknowledgement (ACK) or negative acknowledgement (NACK) for a scheduled PDSCH. Additionally, or alternatively, UE 120 may transmit a PUCCH conveying HARQ ACK/NACK feedback for a semi-persistent scheduled (SPS) communication. Additionally, or alternatively, UE 120 may transmit a PUCCH conveying a scheduling request (SR) or a CSI report.

As indicated above, FIG. 8 is provided as an example. Other examples may differ from what is described with respect to FIG. 8.

FIG. 9 is a diagram illustrating an example process 900 performed, for example, by a UE, in accordance with the present disclosure. Example process 900 is an example where the UE (e.g., UE 120) performs operations associated with mixed physical uplink control channel resource set.

As shown in FIG. 9, in some aspects, process 900 may include receiving information identifying a PUCCH resource set, wherein the PUCCH resource set includes a first PUCCH resource subset configured for frequency hopping per PUCCH resource and a second PUCCH resource subset configured without an associated configuration for frequency hopping per PUCCH resource (block 910). For example, the UE (e.g., using communication manager 140 and/or reception component 1102, depicted in FIG. 11) may receive information identifying a PUCCH resource set, wherein the PUCCH resource set includes a first PUCCH resource subset configured for frequency hopping per PUCCH resource and a second PUCCH resource subset configured without an associated configuration for frequency hopping per PUCCH resource, as described above.

As further shown in FIG. 9, in some aspects, process 900 may include transmitting one or more PUCCH communications with frequency hopping using one or more PUCCH resources of the PUCCH resource set (block 920). For example, the UE (e.g., using communication manager 140 and/or transmission component 1104, depicted in FIG. 11) may transmit one or more PUCCH communications with frequency hopping using one or more PUCCH resources of the PUCCH resource set, as described above.

Process 900 may include additional aspects, such as any single aspect or any combination of aspects described below and/or in connection with one or more other processes described elsewhere herein.

In a first aspect, frequency hopping is inter-slot frequency hopping.

In a second aspect, alone or in combination with the first aspect, the first PUCCH resource subset is associated with a set of configuration parameters for frequency hopping, wherein the set of configuration parameters includes information identifying at least one of a starting resource block, a frequency offset, or a frequency hopping pattern.

In a third aspect, alone or in combination with one or more of the first and second aspects, an indication associated with transmitting the one or more PUCCH communications identifies a PUCCH resource, of the second PUCCH resource subset, configured without the associated configuration for frequency hopping per PUCCH resource, and wherein whether the PUCCH resource is associated with frequency hopping is based at least in part on a PUCCH format of the one or more PUCCH resources.

In a fourth aspect, alone or in combination with one or more of the first through third aspects, the first PUCCH resource subset is associated with a configuration for at least one of a starting physical resource block, a physical resource block for a frequency hop, a frequency offset, a single frequency hop, a plurality of frequency hops, or a pattern for a frequency hop.

In a fifth aspect, alone or in combination with one or more of the first through fourth aspects, a pattern for the frequency hopping configured for a PUCCH resource, of the first PUCCH resource subset, is based at least in part on an index of a slot in which the one or more PUCCH communications are transmitted.

In a sixth aspect, alone or in combination with one or more of the first through fifth aspects, a pattern for the frequency hopping configured for a PUCCH resource, of the first PUCCH resource subset, is based at least in part on whether demodulation reference signal bundling is in an activated state.

In a seventh aspect, alone or in combination with one or more of the first through sixth aspects, the one or more PUCCH resources are associated with conveying at least one of a hybrid automatic repeat request feedback message for a scheduled physical downlink shared channel, a hybrid automatic repeat request feedback message for a semi-persistent scheduled communication, a scheduling request, or a channel state information message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a base station, in accordance with the present disclosure. Example process 1000 is an example where the base station (e.g., base station 110) performs operations associated with mixed PUCCH resource set.

As shown in FIG. 10, in some aspects, process 1000 may include transmitting information identifying a PUCCH resource set, wherein the PUCCH resource set includes a first PUCCH resource subset configured for frequency hopping per PUCCH resource and a second PUCCH resource subset configured without an associated configuration for frequency hopping per PUCCH resource (block 1010). For example, the base station (e.g., using communication manager 150 and/or transmission component 1204, depicted in FIG. 12) may transmit information identifying a PUCCH resource set, wherein the PUCCH resource set includes a first PUCCH resource subset configured for frequency hopping per PUCCH resource and a second PUCCH resource subset configured without an associated configuration for frequency hopping per PUCCH resource, as described above.

As further shown in FIG. 10, in some aspects, process 1000 may include receiving one or more PUCCH communications transmitted with frequency hopping using one or more PUCCH resources of the PUCCH resource set (block 1020). For example, the base station (e.g., using communication manager 150 and/or reception component 1202, depicted in FIG. 12) may receive one or more PUCCH communications transmitted with frequency hopping using one or more PUCCH resources of the PUCCH resource set, as described above.

Process 1000 may include additional aspects, such as any single aspect or any combination of aspects described below and/or in connection with one or more other processes described elsewhere herein.

In a first aspect, frequency hopping is inter-slot frequency hopping.

In a second aspect, alone or in combination with the first aspect, the first PUCCH resource subset is associated with a set of configuration parameters for frequency hopping, wherein the set of configuration parameters includes information identifying at least one of a starting resource block, a frequency offset, or a frequency hopping pattern.

In a third aspect, alone or in combination with one or more of the first and second aspects, an indication associated with transmitting the one or more PUCCH communications identifies a PUCCH resource, of the second PUCCH resource subset, configured without the associated configuration for frequency hopping per PUCCH resource, and wherein whether the PUCCH resource is associated with frequency hopping is based at least in part on a PUCCH format of the one or more PUCCH resources.

In a fourth aspect, alone or in combination with one or more of the first through third aspects, the first PUCCH resource subset is associated with a configuration for at least one of a starting physical resource block, a physical resource block for a frequency hop, a frequency offset, a single frequency hop, a plurality of frequency hops, or a pattern for a frequency hop.

In a fifth aspect, alone or in combination with one or more of the first through fourth aspects, a pattern for the frequency hopping configured for a PUCCH resource, of the first PUCCH resource subset, is based at least in part on an index of a slot in which the one or more PUCCH communications are transmitted.

In a sixth aspect, alone or in combination with one or more of the first through fifth aspects, a pattern for the frequency hopping configured for a PUCCH resource, of the first PUCCH resource subset, is based at least in part on whether demodulation reference signal bundling is in an activated state.

In a seventh aspect, alone or in combination with one or more of the first through sixth aspects, the one or more PUCCH resources are associated with conveying at least one of a hybrid automatic repeat request feedback message for a scheduled physical downlink shared channel, a hybrid automatic repeat request feedback message for a semi-persistent scheduled communication, a scheduling request, or a channel state information message.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
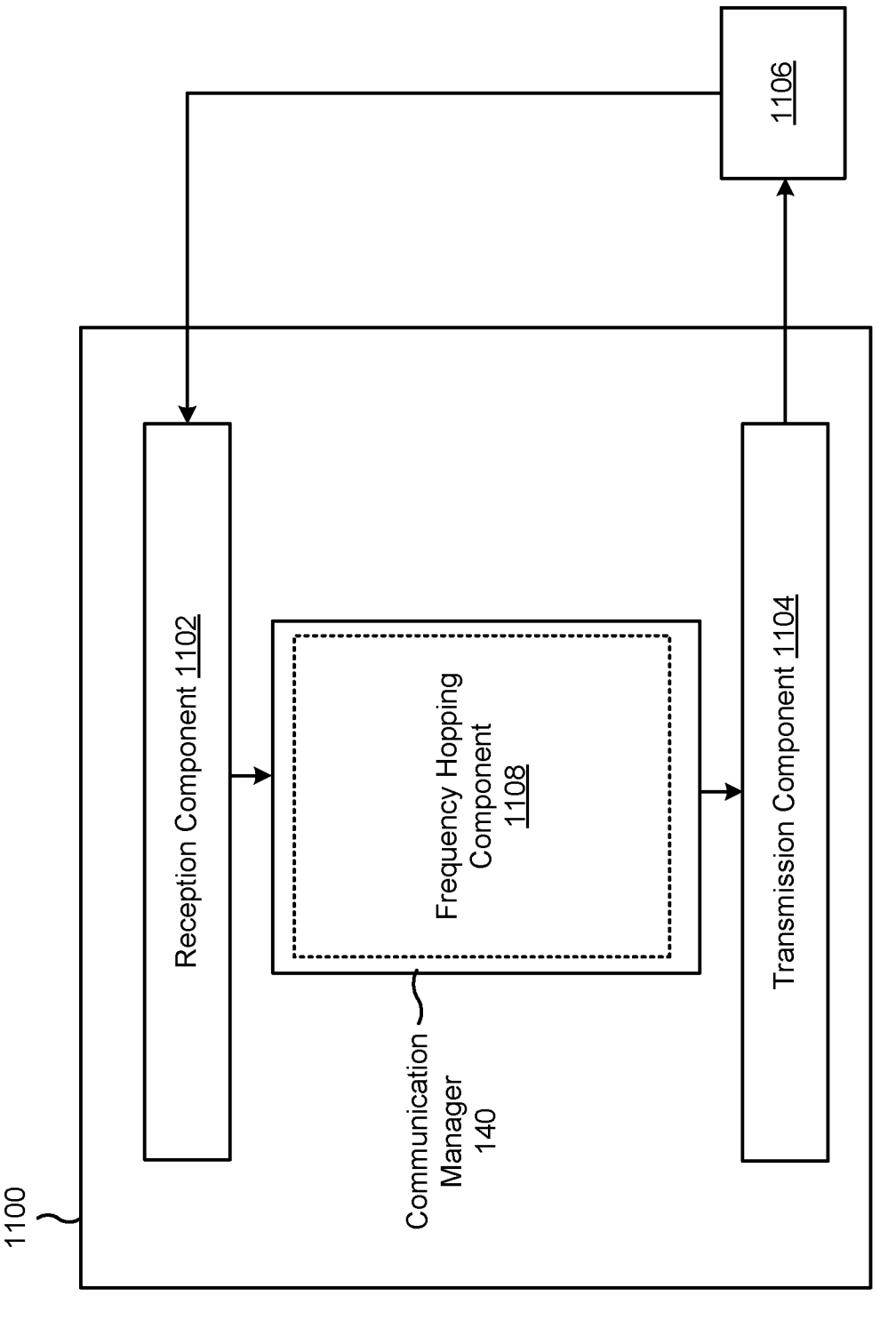
FIGS. 11 and 12 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a frequency hopping component 1108, among other examples.

In some aspects, the apparatus 1100 may be configured to perform one or more operations described herein in connection with FIG. 8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive information identifying a PUCCH resource set, wherein the PUCCH resource set includes a first PUCCH resource subset configured for frequency hopping per PUCCH resource and a second PUCCH resource subset configured without an associated configuration for frequency hopping per PUCCH resource. The transmission component 1104 may transmit one or more PUCCH communications with frequency hopping using one or more PUCCH resources of the PUCCH resource set. Frequency hopping component 1108 may perform frequency hopping on one or more PUCCH resources based at least in part on an indication to communicate using PUCCH resources configured for resource hopping per PUCCH resource.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
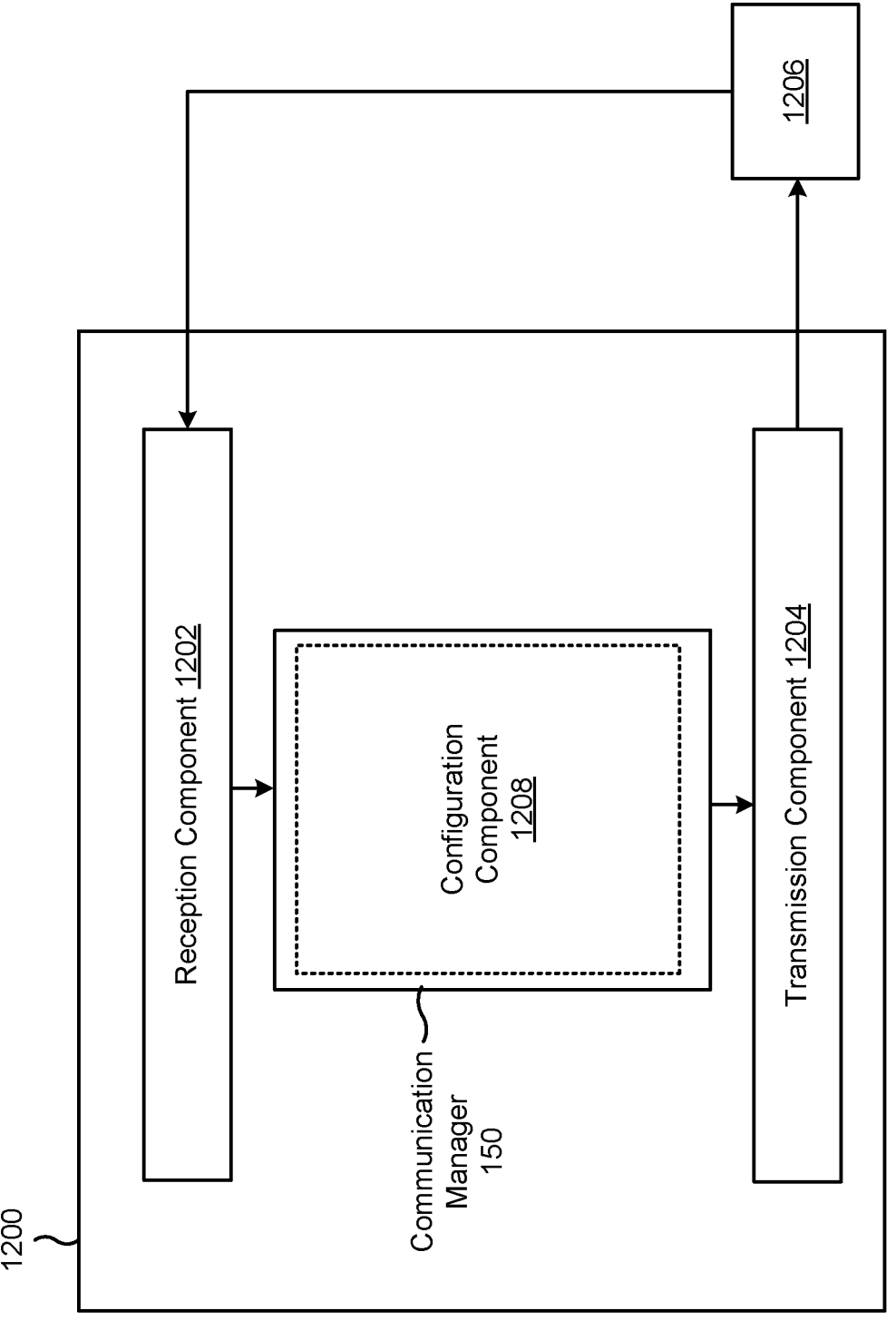

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a configuration component 1208, among other examples.

In some aspects, the apparatus 1200 may be configured to perform one or more operations described herein in connection with FIG. 8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The transmission component 1204 may transmit information identifying a PUCCH resource set, wherein the PUCCH resource set includes a first PUCCH resource subset configured for frequency hopping per PUCCH resource and a second PUCCH resource subset configured without an associated configuration for frequency hopping per PUCCH resource. The reception component 1202 may receive one or more PUCCH communications transmitted with frequency hopping using one or more PUCCH resources of the PUCCH resource set. Configuration component 1208 may configure a PUCCH resource set with a subset of PUCCH resources configured for frequency hopping per PUCCH resource and a subset of PUCCH resources without an associated configuration for frequency hopping per PUCCH resource.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: receiving a PUCCH resource set configuration including a first subset of PUCCH resources and a second subset of PUCCH resources, wherein PUCCH resources in the first subset of PUCCH resources are configured with a repetition factor per PUCCH resource, and wherein PUCCH resources in the second subset of PUCCH resources do not include a repetition factor per PUCCH resource; identifying a repetition factor to be used for transmitting a PUCCH communication based at least in part on the PUCCH resource set configuration; and transmitting one or more repetitions of the PUCCH communication based at least in part on the repetition factor.

Aspect 2: The method of Aspect 1, further comprising: identifying that a PUCCH resource in the first subset of PUCCH resources is to be used for transmitting the PUCCH communication, wherein identifying the repetition factor comprises: identifying the repetition factor based at least in part on a repetition factor associated with the PUCCH resource as configured in the PUCCH resource set configuration. wherein identifying the repetition factor comprises: identifying the repetition factor based at least in part on a repetition factor associated with the PUCCH resource as configured in the PUCCH resource set configuration.

Aspect 3: The method of Aspect 1, further comprising: identifying that a PUCCH resource in the second subset of PUCCH resources is to be used for transmitting the PUCCH communication, wherein identifying the repetition factor comprises: identifying the repetition factor based at least in part on a repetition factor configured for a PUCCH format to be used for the PUCCH communication. wherein identifying the repetition factor comprises: identifying the repetition factor based at least in part on a repetition factor configured for a PUCCH format to be used for the PUCCH communication.

Aspect 4: The method of any of Aspects 1-3, further comprising identifying a PUCCH resource to be used for transmitting the PUCCH communication based at least in part on at least one of a PRI, a location of a CCE, or a dynamic indication.

Aspect 5: The method of Aspect 1, wherein the PUCCH communication includes acknowledgement information associated with a scheduled PDSCH communication.

Aspect 6: The method of any of Aspects 1-5, wherein the PUCCH communication includes acknowledgement information associated with an SPS communication.

Aspect 7: The method of any of Aspects 1-6, wherein the PUCCH communication includes an SR.

Aspect 8: The method of any of Aspects 1-7, wherein the PUCCH communication includes CSI.

Aspect 9: A method of wireless communication performed by a base station, comprising: transmitting a PUCCH resource set configuration including a first subset of PUCCH resources and a second subset of PUCCH resources, wherein PUCCH resources in the first subset of PUCCH resources are configured with a repetition factor per PUCCH resource, and wherein PUCCH resources in the second subset of PUCCH resources do not include a repetition factor per PUCCH resource; identifying a repetition factor to be used for receiving a PUCCH communication based at least in part on the PUCCH resource set configuration; and receiving one or more repetitions of the PUCCH communication based at least in part on the repetition factor.

Aspect 10: The method of Aspect 9, further comprising: identifying that a PUCCH resource in the first subset of PUCCH resources is to be used for transmitting the PUCCH communication, wherein identifying the repetition factor comprises: identifying the repetition factor based at least in part on a repetition factor associated with the PUCCH resource as configured in the PUCCH resource set configuration. wherein identifying the repetition factor comprises: identifying the repetition factor based at least in part on a repetition factor associated with the PUCCH resource as configured in the PUCCH resource set configuration.

Aspect 11: The method of Aspect 9, further comprising: identifying that a PUCCH resource in the second subset of PUCCH resources is to be used for transmitting the PUCCH communication, wherein identifying the repetition factor comprises: identifying the repetition factor based at least in part on a repetition factor configured for a PUCCH format to be used for the PUCCH communication. wherein identifying the repetition factor comprises: identifying the repetition factor based at least in part on a repetition factor configured for a PUCCH format to be used for the PUCCH communication.

Aspect 12: The method of any of Aspects 9-11, wherein the PUCCH communication includes acknowledgement information associated with a scheduled PDSCH communication.

Aspect 13: The method of any of Aspects 9-12, wherein the PUCCH communication includes acknowledgement information associated with an SPS communication.

Aspect 14: The method of any of Aspects 9-13, wherein the PUCCH communication includes an SR.

Aspect 15: The method of any of Aspects 9-14, wherein the PUCCH communication includes CSI.

Aspect 16: An apparatus for wireless communication at a device, comprising a processor; memory coupled with the processor; and instructions stored in the memory and executable by the processor to cause the apparatus to perform the method of one or more of Aspects 1-8.

Aspect 17: A device for wireless communication, comprising a memory and one or more processors coupled to the memory, the one or more processors configured to perform the method of one or more of Aspects 1-8.

Aspect 18: An apparatus for wireless communication, comprising at least one means for performing the method of one or more of Aspects 1-8.

Aspect 19: A non-transitory computer-readable medium storing code for wireless communication, the code comprising instructions executable by a processor to perform the method of one or more of Aspects 1-8.

Aspect 20: A non-transitory computer-readable medium storing a set of instructions for wireless communication, the set of instructions comprising one or more instructions that, when executed by one or more processors of a device, cause the device to perform the method of one or more of Aspects 1-8.

Aspect 21: An apparatus for wireless communication at a device, comprising a processor; memory coupled with the processor; and instructions stored in the memory and executable by the processor to cause the apparatus to perform the method of one or more of Aspects 9-15.

Aspect 22: A device for wireless communication, comprising a memory and one or more processors coupled to the memory, the one or more processors configured to perform the method of one or more of Aspects 9-15.

Aspect 23: An apparatus for wireless communication, comprising at least one means for performing the method of one or more of Aspects 9-15.

Aspect 24: A non-transitory computer-readable medium storing code for wireless communication, the code comprising instructions executable by a processor to perform the method of one or more of Aspects 9-15.

Aspect 25: A non-transitory computer-readable medium storing a set of instructions for wireless communication, the set of instructions comprising one or more instructions that, when executed by one or more processors of a device, cause the device to perform the method of one or more of Aspects 9-15.

Aspect 26: A method of wireless communication performed by a UE, comprising: receiving information identifying a PUCCH resource set, wherein the PUCCH resource set includes a first PUCCH resource subset configured for frequency hopping per PUCCH resource and a second PUCCH resource subset configured without an associated configuration for frequency hopping per PUCCH resource; and transmitting one or more PUCCH communications with frequency hopping using one or more PUCCH resources of the PUCCH resource set.

Aspect 27: The method of Aspect 26, wherein frequency hopping is inter-slot frequency hopping.

Aspect 28: The method of any of Aspects 26 to 27, wherein the first PUCCH resource subset is associated with a set of configuration parameters for frequency hopping, wherein the set of configuration parameters includes information identifying at least one of: a starting resource block, a frequency offset, or a frequency hopping pattern.

Aspect 29: The method of any of Aspects 26 to 28, wherein an indication associated with transmitting the one or more PUCCH communications identifies a PUCCH resource, of the second PUCCH resource subset, configured without the associated configuration for frequency hopping per PUCCH resource, and wherein whether the PUCCH resource is associated with frequency hopping is based at least in part on a PUCCH format of the one or more PUCCH resources.

Aspect 30: The method of any of Aspects 26 to 29, wherein the first PUCCH resource subset is associated with a configuration for at least one of: a starting physical resource block, a physical resource block for a frequency hop, a frequency offset, a single frequency hop, a plurality of frequency hops, or a pattern for a frequency hop.

Aspect 31: The method of any of Aspects 26 to 30, wherein a pattern for the frequency hopping configured for a PUCCH resource, of the first PUCCH resource subset, is based at least in part on an index of a slot in which the one or more PUCCH communications are transmitted.

Aspect 32: The method of any of Aspects 26 to 31, wherein a pattern for the frequency hopping configured for a PUCCH resource, of the first PUCCH resource subset, is based at least in part on whether demodulation reference signal bundling is in an activated state.

Aspect 33: The method of any of Aspects 26 to 32, wherein the one or more PUCCH resources are associated with conveying at least one of: a hybrid automatic repeat request feedback message for a scheduled physical downlink shared channel, a hybrid automatic repeat request feedback message for a semi-persistent scheduled communication, a scheduling request, or a channel state information message.

Aspect 34: A method of wireless communication performed by a base station, comprising: transmitting information identifying a physical uplink control channel (PUCCH) resource set, wherein the PUCCH resource set includes a first PUCCH resource subset configured for frequency hopping per PUCCH resource and a second PUCCH resource subset configured without an associated configuration for frequency hopping per PUCCH resource; and receiving one or more PUCCH communications transmitted with frequency hopping using one or more PUCCH resources of the PUCCH resource set.

Aspect 35: The method of Aspect 34, wherein frequency hopping is inter-slot frequency hopping.

Aspect 36: The method of any of Aspects 34 to 35, wherein the first PUCCH resource subset is associated with a set of configuration parameters for frequency hopping, wherein the set of configuration parameters includes information identifying at least one of: a starting resource block, a frequency offset, or a frequency hopping pattern.

Aspect 37: The method of any of Aspects 34 to 36, wherein an indication associated with transmitting the one or more PUCCH communications identifies a PUCCH resource, of the second PUCCH resource subset, configured without the associated configuration for frequency hopping per PUCCH resource, and wherein whether the PUCCH resource is associated with frequency hopping is based at least in part on a PUCCH format of the one or more PUCCH resources.

Aspect 38: The method of any of Aspects 34 to 37, wherein the first PUCCH resource subset is associated with a configuration for at least one of: a starting physical resource block, a physical resource block for a frequency hop, a frequency offset, a single frequency hop, a plurality of frequency hops, or a pattern for a frequency hop.

Aspect 39: The method of any of Aspects 34 to 38, wherein a pattern for the frequency hopping configured for a PUCCH resource, of the first PUCCH resource subset, is based at least in part on an index of a slot in which the one or more PUCCH communications are transmitted.

Aspect 40: The method of any of Aspects 34 to 39, wherein a pattern for the frequency hopping configured for a PUCCH resource, of the first PUCCH resource subset, is based at least in part on whether demodulation reference signal bundling is in an activated state.

Aspect 41: The method of any of Aspects 34 to 40, wherein the one or more PUCCH resources are associated with conveying at least one of: a hybrid automatic repeat request feedback message for a scheduled physical downlink shared channel, a hybrid automatic repeat request feedback message for a semi-persistent scheduled communication, a scheduling request, or a channel state information message.

Aspect 42: An apparatus for wireless communication at a device, comprising a processor; memory coupled with the processor; and instructions stored in the memory and executable by the processor to cause the apparatus to perform the method of one or more of Aspects 26-33.

Aspect 43: A device for wireless communication, comprising a memory and one or more processors coupled to the memory, the one or more processors configured to perform the method of one or more of Aspects 26-33.

Aspect 44: An apparatus for wireless communication, comprising at least one means for performing the method of one or more of Aspects 26-33.

Aspect 45: A non-transitory computer-readable medium storing code for wireless communication, the code comprising instructions executable by a processor to perform the method of one or more of Aspects 26-33.

Aspect 46: A non-transitory computer-readable medium storing a set of instructions for wireless communication, the set of instructions comprising one or more instructions that, when executed by one or more processors of a device, cause the device to perform the method of one or more of Aspects 26-33.

Aspect 47: An apparatus for wireless communication at a device, comprising a processor; memory coupled with the processor; and instructions stored in the memory and executable by the processor to cause the apparatus to perform the method of one or more of Aspects 34-41.

Aspect 48: A device for wireless communication, comprising a memory and one or more processors coupled to the memory, the one or more processors configured to perform the method of one or more of Aspects 34-41.

Aspect 49: An apparatus for wireless communication, comprising at least one means for performing the method of one or more of Aspects 34-41.

Aspect 50: A non-transitory computer-readable medium storing code for wireless communication, the code comprising instructions executable by a processor to perform the method of one or more of Aspects 34-41.

Aspect 51: A non-transitory computer-readable medium storing a set of instructions for wireless communication, the set of instructions comprising one or more instructions that, when executed by one or more processors of a device, cause the device to perform the method of one or more of Aspects 34-41.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

receive a physical uplink control channel (PUCCH) resource set configuration including a first subset of PUCCH resources and a second subset of PUCCH resources, wherein the first subset of PUCCH resources are configured with one or more repetition factors, wherein each PUCCH resource in the first subset of PUCCH resources is configured with a respective repetition factor of the one or more repetition factors, the respective repetition factor for a PUCCH resource in the first subset of PUCCH resources indicating a quantity of repetitions that the UE is to transmit, and wherein each PUCCH resource in the second subset of PUCCH resources is not configured with a respective repetition factor per PUCCH resource;

identify one or more parameters comprising a repetition factor to be used for transmitting a PUCCH communication based at least in part on the PUCCH resource set configuration; and transmit one or more repetitions of the PUCCH communication based at least in part on the one or more parameters.

2. The UE of claim 1, wherein the one or more processors are further configured to:

identify that a PUCCH resource in the second subset of PUCCH resources is to be used for transmitting the PUCCH communication, wherein the one or more processors, to identify the one or more parameters, are configured to:

identify the one or more parameters based at least in part on a parameter configured for a PUCCH format to be used for the PUCCH communication.

3. The UE of claim 1, wherein the one or more processors are further configured to:

identify that a PUCCH resource in the first subset of PUCCH resources is to be used for transmitting the PUCCH communication, wherein the one or more processors, to identify the one or more parameters, are configured to:

identify the one or more parameters based at least in part on a parameter associated with the PUCCH resource as configured in the PUCCH resource set configuration.

4. The UE of claim 1, wherein the one or more processors are further configured to identify a PUCCH resource to be used for transmitting the PUCCH communication based at least in part on at least one of a PUCCH resource indicator (PRI), a location of a control channel element (CCE), or a dynamic indication.

5. The UE of claim 1, wherein the PUCCH communication includes acknowledgement information associated with a scheduled physical downlink shared channel (PDSCH) communication.

6. The UE of claim 1, wherein the PUCCH communication includes acknowledgement information associated with a semi-persistent scheduling (SPS) communication.

7. The UE of claim 1, wherein the PUCCH communication includes a scheduling request (SR).

8. The UE of claim 1, wherein the PUCCH communication includes channel state information (CSI).

9. The UE of claim 1, wherein the one or more parameters include a configuration for frequency hopping.

10. A base station for wireless communication, comprising:

one or more memories; and one or more processors, coupled to the one or more memories, configured to:

transmit a physical uplink control channel (PUCCH) resource set configuration including a first subset of PUCCH resources and a second subset of PUCCH resources, wherein the first subset of PUCCH resources are configured with one or more repetition factors, wherein each PUCCH resource in the first subset of PUCCH resources is configured with a respective repetition factor of the one or more repetition factors, the respective repetition factor for a PUCCH resource in the first subset of PUCCH resources indicating a quantity of repetitions that a user equipment (UE) is to transmit, and wherein each PUCCH resource in the second subset of PUCCH resources is not configured with a respective repetition factor per PUCCH resource;

identify one or more parameters comprising a repetition factor to be used for receiving a PUCCH communication based at least in part on the PUCCH resource set configuration; and receive one or more repetitions of the PUCCH communication based at least in part on the one or more parameters.

11. The base station of claim 10, wherein the one or more processors are further configured to:

identify that a PUCCH resource in the second subset of PUCCH resources is to be used for transmitting the PUCCH communication, wherein the one or more processors, to identify the one or more parameters, are configured to:

identify the one or more parameters based at least in part on a parameter configured for a PUCCH format to be used for the PUCCH communication.

12. The base station of claim 10, wherein the one or more processors are further configured to:

identify that a PUCCH resource in the first subset of PUCCH resources is to be used for transmitting the PUCCH communication, wherein the one or more processors, to identify the one or more parameters, are configured to:

identify the one or more parameters based at least in part on a parameter associated with the PUCCH resource as configured in the PUCCH resource set configuration.

13. The base station of claim 10, wherein the PUCCH communication includes acknowledgement information associated with a scheduled physical downlink shared channel (PDSCH) communication.

14. The base station of claim 10, wherein the PUCCH communication includes acknowledgement information associated with a semi-persistent scheduling (SPS) communication.

15. The base station of claim 10, wherein the PUCCH communication includes a scheduling request (SR).

16. The base station of claim 10, wherein the PUCCH communication includes channel state information (CSI).

17. The base station of claim 10, wherein the one or more parameters include a configuration for frequency hopping.

18. A method of wireless communication performed by a user equipment (UE), comprising:

receiving a physical uplink control channel (PUCCH) resource set configuration including a first subset of PUCCH resources and a second subset of PUCCH resources, wherein the first subset of PUCCH resources are configured with one or more repetition factors, wherein each PUCCH resource in the first subset of PUCCH resources is configured with a respective repetition factor of the one or more repetition factors, the respective repetition factor for a PUCCH resource in the first subset of PUCCH resources indicating a quantity of repetitions that the UE is to transmit, and wherein each PUCCH resource in the second subset of PUCCH resources is not configured with a respective repetition factor per PUCCH resource;

identifying one or more parameters comprising repetition factor to be used for transmitting a PUCCH communication based at least in part on the PUCCH resource set configuration; and transmitting one or more repetitions of the PUCCH communication based at least in part on the repetition factor.

19. The method of claim 18, further comprising:

identifying that a PUCCH resource in the second subset of PUCCH resources is to be used for transmitting the PUCCH communication, wherein identifying the one or more parameters comprises:

identifying the one or more parameters based at least in part on a parameter configured for a PUCCH format to be used for the PUCCH communication.

20. The method of claim 18, further comprising:

identifying that a PUCCH resource in the first subset of PUCCH resources is to be used for transmitting the PUCCH communication, wherein identifying the one or more parameters comprises:

identifying the one or more parameters based at least in part on a parameter associated with the PUCCH resource as configured in the PUCCH resource set configuration.

21. The method of claim 18, further comprising identifying a PUCCH resource to be used for transmitting the PUCCH communication based at least in part on at least one of a PUCCH resource indicator (PRI), a location of a control channel element (CCE), or a dynamic indication.

22. The method of claim 18, wherein the PUCCH communication includes acknowledgement information associated with a scheduled physical downlink shared channel (PDSCH) communication.

23. The method of claim 18, wherein the PUCCH communication includes acknowledgement information associated with a semi-persistent scheduling (SPS) communication.

24. The method of claim 18, wherein the PUCCH communication includes a scheduling request (SR).

25. A method of wireless communication performed by a base station, comprising:

transmitting a physical uplink control channel (PUCCH) resource set configuration including a first subset of PUCCH resources and a second subset of PUCCH resources, wherein the first subset of PUCCH resources are configured with one or more repetition factors, wherein each PUCCH resource in the first subset of PUCCH resources is configured with a respective repetition factor of the one or more repetition factors, the respective repetition factor for a PUCCH resource in the first subset of PUCCH resources indicating a quantity of repetitions that a user equipment (UE) is to transmit, and wherein each PUCCH resources in the second subset of PUCCH resources is not configured with a respective repetition factor per PUCCH resource;

identifying one or more parameters comprising a repetition factor to be used for receiving a PUCCH communication based at least in part on the PUCCH resource set configuration; and receiving one or more repetitions of the PUCCH communication based at least in part on the one or more parameters.

26. The method of claim 25, further comprising:

identifying that a PUCCH resource in the second subset of PUCCH resources is to be used for transmitting the PUCCH communication, wherein identifying the one or more parameters comprises:

identifying the one or more parameters based at least in part on a parameter configured for a PUCCH format to be used for the PUCCH communication.

27. The method of claim 25, further comprising:

identifying that a PUCCH resource in the first subset of PUCCH resources is to be used for transmitting the PUCCH communication, wherein identifying the one or more parameters comprises:

identifying the one or more parameters based at least in part on a parameter associated with the PUCCH resource as configured in the PUCCH resource set configuration.

28. The method of claim 25, wherein the PUCCH communication includes acknowledgement information associated with a scheduled physical downlink shared channel (PDSCH) communication.

29. The method of claim 25, wherein the PUCCH communication includes acknowledgement information associated with a semi-persistent scheduling (SPS) communication.

30. The method of claim 25, wherein the PUCCH communication includes a scheduling request (SR).

* * * * *